(12) United States Patent
Okabe et al.

(10) Patent No.: US 11,066,939 B2
(45) Date of Patent: Jul. 20, 2021

(54) COMPOSITE BLADE AND METHOD FOR PRODUCING COMPOSITE BLADE

(71) Applicant: MITSUBISHI HEAVY INDUSTRIES, LTD., Tokyo (JP)

(72) Inventors: Ryoji Okabe, Tokyo (JP); Yoshinori Nonaka, Tokyo (JP); Kentaro Shindo, Tokyo (JP); Masami Kamiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 92 days.

(21) Appl. No.: 16/613,305

(22) PCT Filed: May 30, 2018

(86) PCT No.: PCT/JP2018/020780
§ 371 (c)(1),
(2) Date: Nov. 13, 2019

(87) PCT Pub. No.: WO2018/221597
PCT Pub. Date: Dec. 6, 2018

(65) Prior Publication Data
US 2021/0108521 A1 Apr. 15, 2021

(30) Foreign Application Priority Data
May 31, 2017 (JP) .............................. JP2017-108380

(51) Int. Cl.
*F01D 5/28* (2006.01)
*B29C 70/16* (2006.01)
(Continued)

(52) U.S. Cl.
CPC .............. *F01D 5/282* (2013.01); *B29C 70/16* (2013.01); *B29C 70/30* (2013.01); *F01D 5/30* (2013.01);
(Continued)

(58) Field of Classification Search
CPC ......... F01D 5/282; F01D 5/284; B29C 70/16; B29C 70/30
See application file for complete search history.

(56) References Cited

U.S. PATENT DOCUMENTS

| 4,810,167 A | 5/1989 | Spoltman et al. |
| 5,375,978 A | 12/1994 | Evans et al. |

(Continued)

FOREIGN PATENT DOCUMENTS

JP 2014-84864 5/2014

OTHER PUBLICATIONS

International Search Report dated Aug. 14, 2018 in International (PCT) Application No. PCT/JP2018/020780.
(Continued)

*Primary Examiner* — Justin D Seabe
(74) *Attorney, Agent, or Firm* — Wenderoth, Lind & Ponack, L.L.P.

(57) ABSTRACT

A composite blade is formed by laying up composite layers in which reinforced fibers are impregnated with resin, and has a blade root and an airfoil extending from the blade root in a longitudinal direction. The composite blade includes a first laminate of the composite layers extending along the longitudinal direction in the airfoil and extending along a first inclination direction inclined toward a direction intersecting the longitudinal direction in the blade root; a second laminate of the composite layers extending along the longitudinal direction and contacting the first laminate in the airfoil, the second laminate extending along a second inclination direction inclined toward a direction opposite to the first inclination direction in the blade root and being separated from the first laminate; and a third laminate of the composite layers provided between the first and second laminates in the blade root.

6 Claims, 12 Drawing Sheets

(51) Int. Cl.
*B29C 70/30* (2006.01)
*F01D 5/30* (2006.01)
(52) U.S. Cl.
CPC .... *F05D 2230/60* (2013.01); *F05D 2300/603* (2013.01)

(56) References Cited

U.S. PATENT DOCUMENTS

| | | | |
|---|---|---|---|
| 8,568,082 B2* | 10/2013 | Beckford | F01D 21/045 |
| | | | 415/9 |
| 9,435,209 B2* | 9/2016 | Garcia Crespo | F01D 5/147 |
| 10,577,939 B2* | 3/2020 | Vetters | F01D 5/147 |
| 2005/0084379 A1* | 4/2005 | Schreiber | F04D 29/34 |
| | | | 416/230 |
| 2005/0158171 A1* | 7/2005 | Carper | F01D 5/284 |
| | | | 415/200 |
| 2014/0119928 A1 | 5/2014 | Garcia Crespo | |
| 2016/0138406 A1 | 5/2016 | Freeman | |
| 2016/0146021 A1 | 5/2016 | Freeman et al. | |

OTHER PUBLICATIONS

Written Opinion dated Aug. 14, 2018 in International (PCT) Application No. PCT/JP2018/020780.

* cited by examiner

COMPOSITE BLADE AND METHOD FOR PRODUCING COMPOSITE BLADE

FIELD

The present disclosure relates to a composite blade and a method for producing the composite blade.

BACKGROUND

A turbine blade for a gas turbine has an airfoil for receiving gas and a blade root (dovetail part) provided at a terminal of the airfoil. The blade root is fitted to a groove provided in a turbine disk. The blade root has a thickness larger than that of the airfoil, and is thus structured so as not to fall out of the groove in the turbine disk even when centrifugal force acts on the turbine blade.

In recent years, composite material is sometimes used as the material of the turbine blade for a gas turbine. The composite material is formed by laying up composite layers in which reinforced fiber is impregnated with resin. When the composite material is used for a turbine blade, a composite layer (reinforced fiber) is extended from an airfoil to a blade root in some cases. In this case, for example, as disclosed in Patent Literature 1, the composite layer is extended along a longitudinal direction in a region of the airfoil, but is expanded (inclined) outward in a region of the blade root so as to have a large thickness. If the composite layer is expanded outward in the blade root, however, a distance between composite layers, that is, a distance between reinforced fibers, is increased in the blade root. In this case, a region between reinforced fibers is filled with resin but has no reinforced fiber, and hence the strength reduces. In Patent Literature 1, a plurality of short composite layers are provided between layers along a thickness direction to suppress the reduction in strength.

CITATION LIST

Patent Literature

Patent Literature 1: U.S. Pat. No. 5,375,978

SUMMARY

Technical Problem

However, when short composite layers are provided along the thickness direction as disclosed in Patent Literature 1, a ply drop is left at the tip of the short composite layer. The ply drop is a region having no reinforced fiber and filled with resin, and is a region with low strength. When composite layers are provided as disclosed in Patent Literature 1, a plurality of the ply drops are formed in the thickness direction. In particular, stress is high near an end part of the blade root in the thickness direction. Thus, when composite layers are formed as disclosed in Patent Literature 1, the risk of breakage starting from the ply drops is high. Therefore, it is required to suppress the reduction in strength of the blade root when composite material is used for a turbine blade.

The present disclosure solves the above-mentioned problem, and it is an object thereof to provide a composite blade that suppresses the reduction in strength of a blade root when composite material is used for a turbine blade, and a method for producing the composite blade.

Solution to Problem

To solve the problems described above and achieve the object, a composite blade according to the present disclosure is formed by laying up composite layers in which reinforced fibers are impregnated with resin, and has a blade root and an airfoil extending from the blade root in a longitudinal direction. The composite blade includes: a first laminate as a laminate of the composite layers, the first laminate extending along the longitudinal direction in the airfoil and extending along a first inclination direction inclined toward a direction intersecting the longitudinal direction in the blade root; a second laminate as a laminate of the composite layers, the second laminate extending along the longitudinal direction and contacting the first laminate in the airfoil, the second laminate extending along a second inclination direction inclined toward a direction opposite to the first inclination direction in the blade root and being separated from the first laminate; and a third laminate as a laminate of the composite layers, the third laminate being provided between the first laminate and the second laminate in the blade root.

It is preferable that, in the third laminate, composite layers laid up on the first laminate side extend along the first inclination direction, and composite layers laid up on the second laminate side extend along the second inclination direction.

It is preferable that, in the first laminate, reinforced fibers in the composite layer continuously extend from the airfoil to the blade root, extend along a plane parallel to the longitudinal direction at the airfoil, and extend along a plane parallel to the first inclination direction at the blade root; in the second laminate, reinforced fibers in the composite layer continuously extend from the airfoil to the blade root, extend along a plane parallel to the longitudinal direction at the airfoil, and extend along a plane parallel to the second inclination direction at the blade root; and in the third laminate, reinforced fibers in composite layers laid up on the first laminate side extend along a plane parallel to the first inclination direction, and reinforced fibers in composite layers laid up on the second laminate side extend along a plane parallel to the second inclination direction.

It is preferable that the third laminate includes a one-side third laminate that is provided on the first laminate side and in which reinforced fibers in the composite material extend along a plane parallel to the first inclination direction, and an another-side third laminate that is provided on the second laminate side and in which reinforced fibers in the composite material extend along a plane parallel to the second inclination direction.

It is preferable that a tip of the reinforced fiber in the one-side third laminate is opposed to a tip of the reinforced fiber in the another-side third laminate.

It is preferable that, in the third laminate, reinforced fibers in the composite layer continuously extend from the first laminate side to the second laminate side, extend along a plane parallel to the first inclination direction on the first laminate side, and extend along a plane parallel to the second inclination direction on the second laminate side.

It is preferable that the composite blade further includes a block part provided between the first laminate and the second laminate at the blade root and provided on a base end part side opposite to the airfoil in the blade root with respect to the third laminate.

It is preferable that a location at which the tip of the reinforced fiber in the one-side third laminate is opposed to the tip of the reinforced fiber in the another-side third laminate is located between the first laminate and the second laminate in the blade root, and at a center part between the first laminate and the second laminate.

It is preferable that, in the third laminate, a bending intermediate part between a location extending along a plane parallel to the first inclination direction and a location extending along a plane parallel to the second inclination direction is located between the first laminate and the second laminate in the blade root, and at a center part between the first laminate and the second laminate.

To solve the problems described above and achieve the object, a method according to the present disclosure is for producing a composite blade formed by laying up composite layers in which reinforced fibers are impregnated with resin, the composite blade having a blade root and an airfoil extending from the blade root in a longitudinal direction. The method includes: a first laminate forming step of forming a first laminate as a laminate of the composite layers, the first laminate extending along the longitudinal direction in the airfoil and extending along a first inclination direction inclined toward a direction intersecting the longitudinal direction in the blade root; a second laminate forming step of forming a second laminate as a laminate of the composite layers, the second laminate extending along the longitudinal direction and contacting the first laminate in the airfoil, the second laminate extending along a second inclination direction inclined toward a direction opposite to the first inclination direction in the blade root and being separated from the first laminate; and a third laminate forming step of forming a third laminate as a laminate of the composite layers, the third laminate being provided between the first laminate and the second laminate in the blade root.

It is preferable that the first laminate forming step includes laying up composite layers to form a one-side third laminate on the first laminate in the blade root, the second laminate forming step includes laying up composite layers to form an another-side third laminate on the second laminate in the blade root, and the third composite layer forming step includes bonding the first laminate to the second laminate in the airfoil and bonding the one-side third laminate to the another-side third laminate in the blade root to form the third laminate.

It is preferable that the method for producing a composite blade includes a molding step of molding the first laminate, the second laminate, and the third laminate by inserting a block part to a side of a base end part of the blade root opposite to the airfoil with respect to the third laminate between the first laminate and the second laminate in the blade root and pushing the block part toward the third laminate.

Advantageous Effects of Invention

According to the present disclosure, the reduction in strength of the blade root can be suppressed when composite material is used for a turbine blade.

DESCRIPTION OF EMBODIMENTS

Referring to the accompanying drawings, preferred embodiments of the present invention are described in detail below. The present invention is not limited by the embodiments. When there are a plurality of embodiments, the present invention includes a combination of the embodiments.

Figure 1:
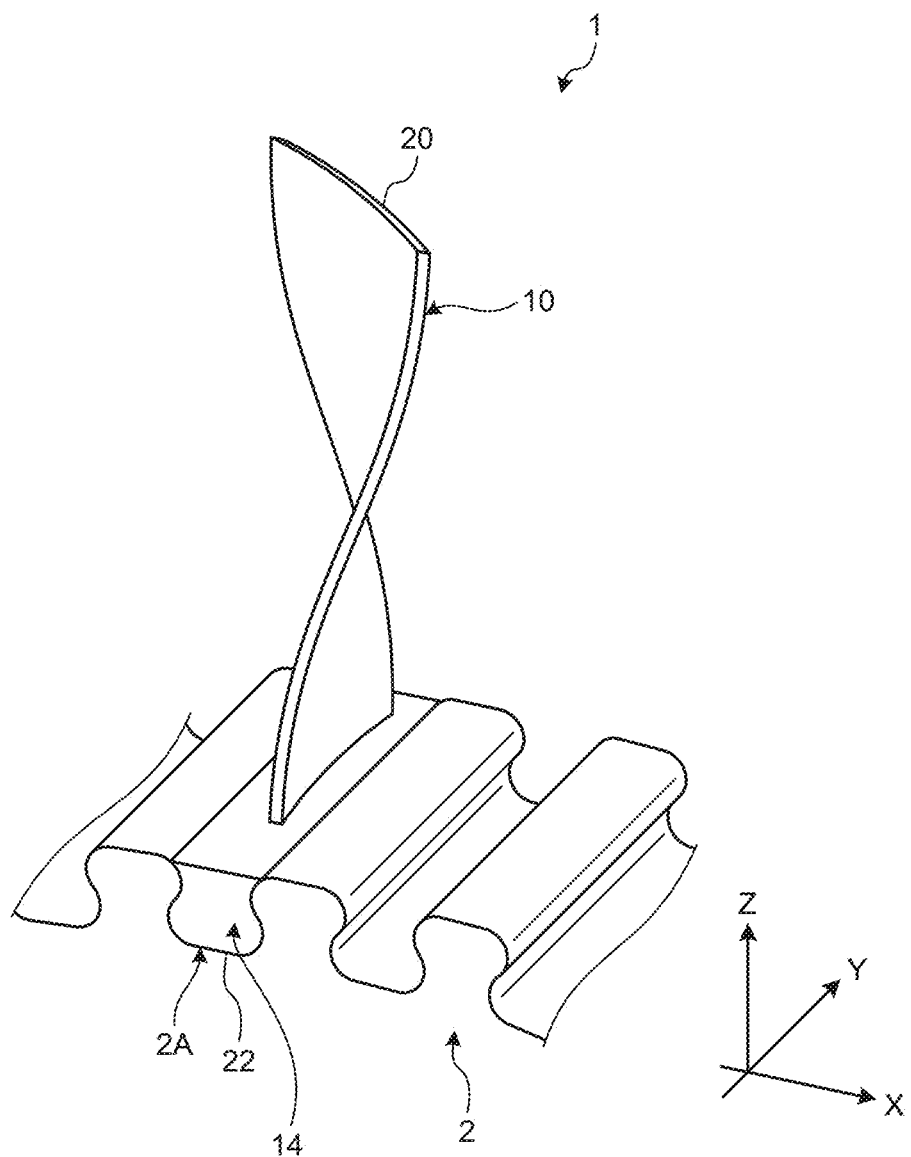
FIG. 1 is a schematic diagram illustrating a configuration of a composite blade according to a first embodiment.

FIG. 1 is a schematic diagram illustrating a configuration of a composite blade according to a first embodiment. A composite blade 1 according to the first embodiment is a turbine blade for a gas turbine. For example, a gas turbine using the composite blade 1 is used for an aircraft engine, but may be used for other purposes, such as a power generation gas turbine.

As illustrated in FIG. 1, the composite blade 1 extends from a tip part 20 to a base end part 22. The composite blade 1 is mounted to a turbine disk 2 at the base end part 22. Directions X, Y, and Z are described below. In the following, the direction Z is a direction in which the composite blade 1 extends, that is, a direction along the tip part 20 to the base end part 22. The direction Z is a longitudinal direction of the composite blade 1, and corresponds to a radial direction (radiation direction) of the turbine disk 2. The direction Y is a direction orthogonal to the direction Z, and is a direction along an axial direction of the turbine disk 2. The direction X is a direction orthogonal to the direction Y and the direction Z, and is a direction along the circumferential direction of the turbine disk 2.

The composite blade 1 includes an airfoil 10 and a blade root 14 (dovetail part). The airfoil 10 is a blade that receives gas flowing through a gas turbine. The blade root 14 is provided at the root of the airfoil 10. In other words, the airfoil 10 extends along the direction Z (longitudinal direction) from the blade root 14. The composite blade 1 is mounted to the turbine disk 2 at the blade root 14. The turbine disk 2 has a plurality of grooves 2A along the circumferential direction. The length (width) of the blade root 14 along the direction X is larger than the length of the airfoil 10 along the direction X. The composite blade 1 is mounted and fixed to the turbine disk 2 in a manner that the blade root 14 is mounted in the groove 2A.

The composite blade 1 is formed by laying up composite layers. The composite layer is a layer of composite material including reinforced fibers (reinforced fibers 36, 46, 66, and 76 described later) and resin (resin 34, 44, 64, and 74 described later), and is a layer of composite material in which reinforced fibers are impregnated with resin. The composite material in the present embodiment is carbon fiber reinforced plastic (CFRP) in which carbon fiber is used as reinforced fiber. The reinforced fiber is not limited to carbon fiber, and may be other types of fiber, such as plastic fiber, glass fiber, and metal fiber. Examples of resin include thermosetting resin and thermoplastic resin. Examples of thermosetting resin include epoxy resin. Examples of thermoplastic resin include polyetheretherketone (PEEK), polyetherketoneketone (PEKK), and polyphenylenesulfide (PPS). The resin is not limited thereto, and another resin may be used.

Figure 2:
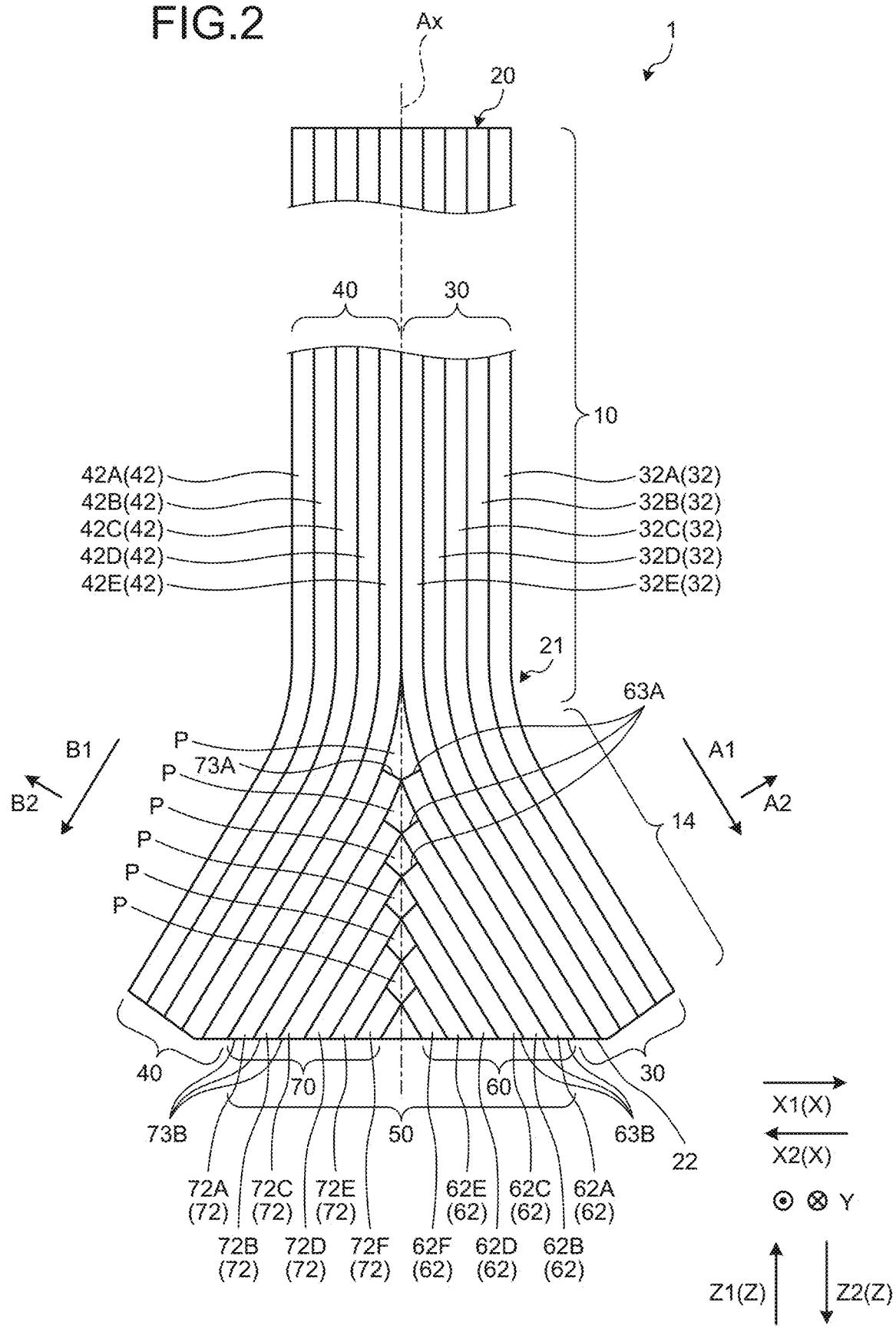
FIG. 2 is a schematic diagram illustrating a detailed configuration of the composite blade according to the first embodiment.

Now, the structure of the composite blade 1 is described in more detail. FIG. 2 is a schematic diagram illustrating a detailed configuration of the composite blade according to the first embodiment. FIG. 2 is a cross-sectional view of the composite blade 1 as seen from the direction Y (direction orthogonal to longitudinal direction), whose cross-section is orthogonal to the direction Y. As illustrated in FIG. 2, the composite blade 1 extends toward a direction Z1 from the base end part 22 to the tip part 20. The direction Z1 is one of directions along the direction Z, and is a direction toward the tip part 20 from the base end part 22. A direction Z2 is a direction (direction toward base end part 22 from tip part 20) opposite to the direction Z1, and is the other of the directions along the direction Z. One of directions along the direction X is a direction X1, and the other of the directions along the direction X, that is, a direction opposite to the direction X1, is a direction X2.

In the composite blade 1, the region from the tip part 20 to a blade end part 21 is the airfoil 10, and the region from the blade end part 21 to the base end part 22 is the blade root 14. The blade end part 21 is a base end part of the airfoil 10, and is a location at a boundary between the airfoil 10 and the blade root 14. The blade end part 21 is located between the tip part 20 and the base end part 22 in the direction Z. In the composite blade 1, the laid-up composite layers extend along the direction Z in the airfoil 10. In the composite blade 1, the laid-up composite layers extend while being inclined from the direction Z toward a direction (direction X) intersecting the direction Z and being expanded outward toward the direction X in the blade root 14. In the composite blade 1, the composite layer expands along the direction X in the blade root 14 as described above, and hence the length (width) of the blade root 14 along the direction X is set larger than the length of the airfoil 10 along the direction X. More specifically, the composite blade 1 has a first laminate 30, a second laminate 40, and a third laminate 50.

First Laminate

The first laminate 30 is a laminate in which a plurality of composite layers are laid up. In the example in FIG. 2, in the composite layer 30, composite layers 32A, 32B, 32C, 32D, and 32E are laid up. The composite layers 32A, 32B, 32C, 32D, and 32E are laid up in this order toward the direction X2. In the following, the composite layers 32A, 32B, 32C, 32D, and 32E are referred to as "composite layers 32" unless otherwise distinguished from one another. In the example in FIG. 2, the first laminate 30 has five composite layers 32, but the number of the laid-up composite layers 32 may be any number more than one.

As illustrated in FIG. 2, the composite layers 32 extend along the direction Z (longitudinal direction) in the airfoil 10. The composite layers 32 are laid up along the direction X in the airfoil 10. In other words, in the airfoil 10, the lamination direction of the composite layers 32 is the direction X. The longitudinal direction (direction Z) in which the composite layers 32 extend is orthogonal to the lamination direction (direction X).

In the blade root 14, the composite layers 32 extend along a first inclination direction A1 from the blade end part 21 toward the base end part 22. The first inclination direction A1 is a direction inclined from the direction Z (direction Z2) in a direction intersecting the direction Z (direction Z2). In other words, the first inclination direction A1 is a direction inclined at a predetermined angle from the direction Z (direction Z2) toward the direction X1. In other words, the first inclination direction A1 is a direction inclined from the longitudinal direction (direction Z) to the lamination direction (direction X) in the airfoil 10. In the blade root 14, the composite layers 32 are laid up along a first lamination direction A2. The first lamination direction A2 is a direction orthogonal to the first inclination direction A1, and is a direction inclined from the lamination direction (direction X1) in the airfoil 10 toward the direction Z1.

The composite layers 32 continuously extend from the tip part 20 to the base end part 22 through the blade end part 21. Specifically, the composite layers 32 extend along the direction Z from the tip part 20 to the blade end part 21, and extend along the first inclination direction A1 from the blade end part 21 to the base end part 22 while being inclined toward the direction X1.

Figure 3:
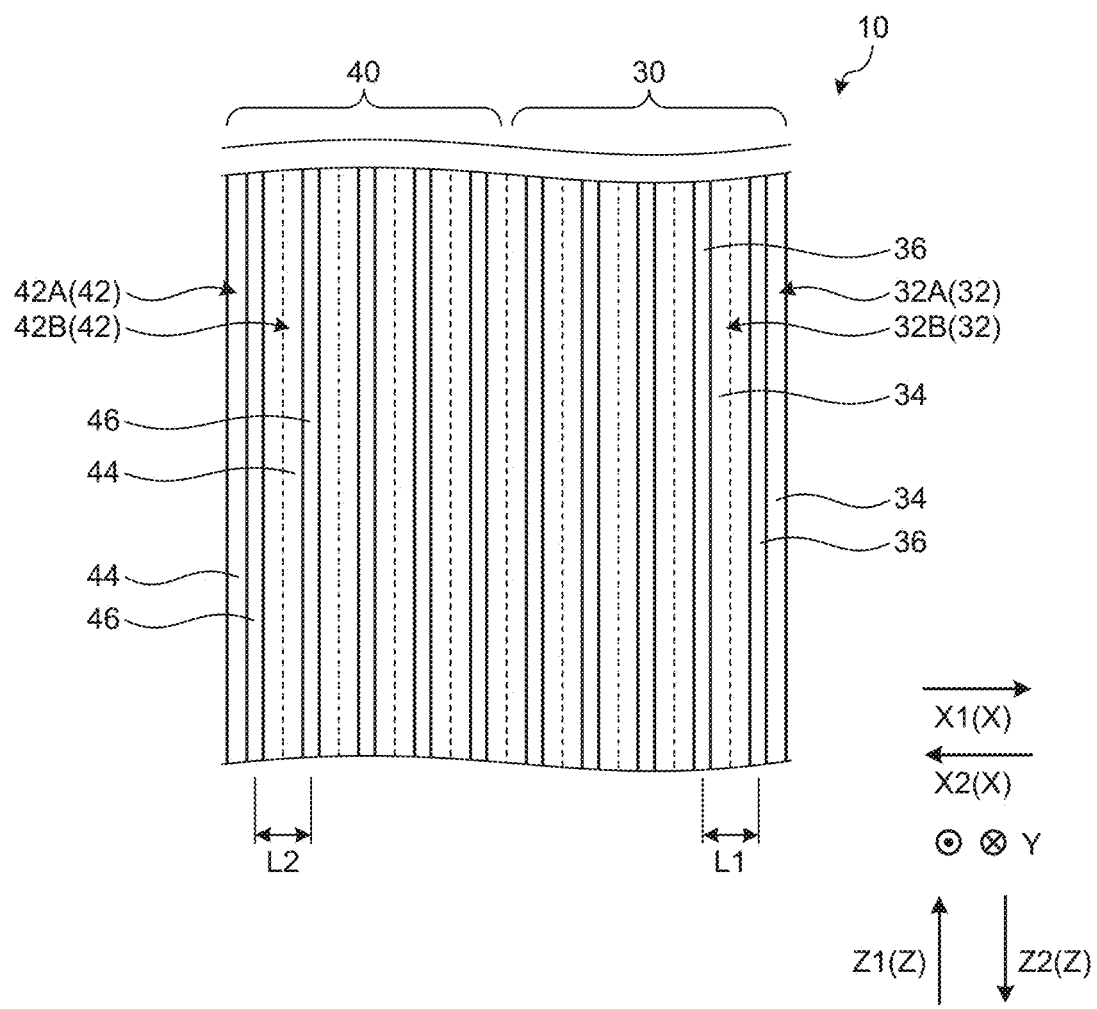
FIG. 3 is a schematic diagram of composite layers.
Figure 4:
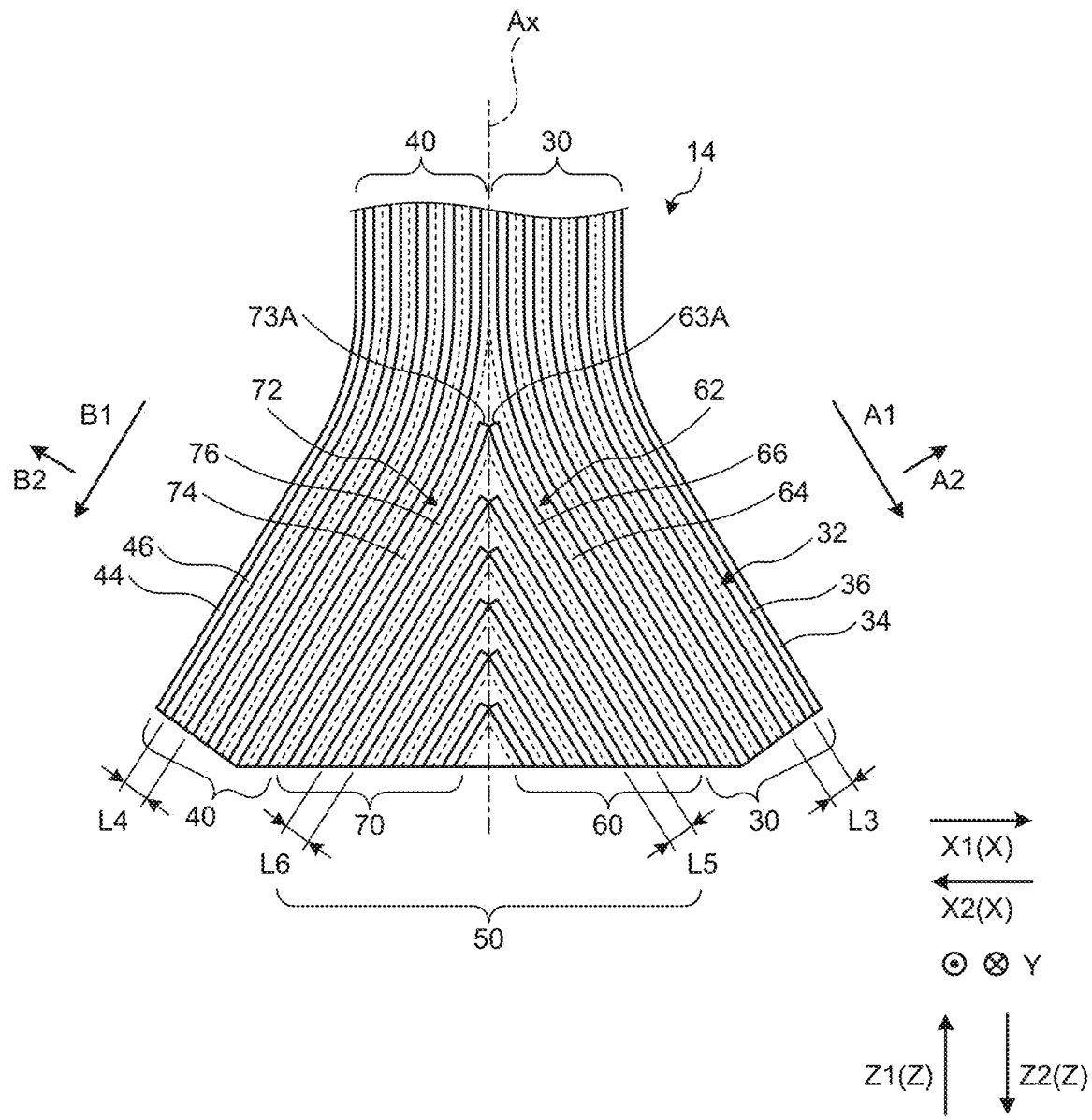
FIG. 4 is a schematic diagram of the composite layers.

FIG. 3 and FIG. 4 are schematic diagrams of the composite layers. FIG. 3 is a schematic diagram of the composite layers 32 in the airfoil 10, and is a cross-sectional view of the airfoil 10 as seen from the direction Y (direction orthogonal to longitudinal direction), whose cross-section is a plane orthogonal to the direction Y. FIG. 4 is a schematic diagram of the composite layers 32 in the blade root 14, and is a cross-sectional view of the blade root 14 as seen from the direction Y (direction orthogonal to longitudinal direction), whose cross-section is a plane orthogonal to the direction Y. As illustrated in FIG. 3, the composite layer 32 has the resin 34 and the reinforced fibers 36. In the composite layer 32, a plurality of the reinforced fibers 36 are provided along the direction Y, and the resin 34 is filled around the reinforced fibers 36. In the composite layers 32, adjacent (laid up) composite layers 32 and the resin 34 are bonded together, so that a part corresponding to the resin 34 is integrated with another composite layer 32. Thus, a composite layer 32 in the first laminate 30 can be regarded as a layer in which the reinforced fiber 36 and the surrounding resin 34 are present. The first laminate 30 can be regarded as a laminate in which layers each formed of the reinforced fiber 36 and the surrounding resin 34 are laid up in the lamination direction.

The extending direction and the lamination direction of the composite layers 32 have been described above, but can be replaced with the extending direction and the lamination direction of the reinforced fibers 36 for description. Specifically, as illustrated in FIG. 3, in the composite layer 32, the reinforced fibers 36 extend along the direction Z (longitudinal direction) in the airfoil 10. In the composite layer 32, in the airfoil 10, layers in which a plurality of reinforced fibers 36 extend along the direction Y are laid up along the direction X. The reinforced fiber 36 may extend in the airfoil 10 while being inclined from the direction Z toward the direction Y. In other words, the reinforced fiber 36 only needs to extend in the airfoil 10 toward the direction Z2 along a plane parallel to the direction Z. The composite layer 32 may further have another reinforced fiber extending in a direction different from the direction of the reinforced fiber 36, and, for example, the other reinforced fiber may be woven into the reinforced fiber 36.

As illustrated in FIG. 4, in the composite layer 32, in the blade root 14, the reinforced fiber 36 extends along the first inclination direction A1 from the blade end part 21 toward the base end part 22. In the composite layer 32, in the blade root 14, layers in which the reinforced fibers 36 extend along the direction Y are laid up along the first lamination direction A2. The reinforced fiber 36 may extend in the blade root 14 while being inclined from the first inclination direction A1 toward the direction Y. In other words, the reinforced fiber 36 only needs to extend in the blade root 14 toward the direction Z2 along a plane parallel to the first inclination direction A1.

The reinforced fibers 36 continuously extend from the tip part 20 to the base end part 22 through the blade end part 21. Specifically, the reinforced fibers 36 extend along a plane parallel to the direction Z from the tip part 20 to the blade end part 21, and extend along a plane parallel to the first inclination direction A1 from the blade end part 21 to the base end part 22 while being inclined toward the direction X1 from the blade end part 21.

Second Laminate

Next, the second laminate 40 is described. Similarly to the first laminate 30, the second laminate 40 is a laminate in which a plurality of composite layers are laid up. The second laminate 40 is provided so as to be opposed to the first laminate 30. In the example in FIG. 2, in the composite layer 40, composite layers 42A, 42B, 42C, 42D, and 42E are laid up. The composite layers 42A, 42B, 42C, 42D, and 42E are laid up in this order toward the direction X1. In the following, the composite layers 42A, 42B, 42C, 42D, and 42E are referred to as "composite layers 42" unless otherwise distinguished from one another. In the example in FIG. 2, the second laminate 40 has five composite layers 42, but the number of the laid-up composite layers 42 may be any number more than one.

As illustrated in FIG. 2, the composite layers 42 extend along the direction Z (longitudinal direction) in the airfoil 10. The composite layers 42 are laid up along the direction X in the airfoil 10. In other words, in the airfoil 10, the lamination direction of the composite layers 42 is the direction X. The longitudinal direction (direction Z) in which the composite layers 42 extend is orthogonal to the lamination direction (direction X).

In this manner, in the airfoil 10, the extending direction and the lamination direction of the composite layers 42 in the second laminate 40 match the extending direction and the lamination direction of the composite layers 32 in the first laminate 30. In the second laminate 40, in the airfoil 10, the composite layer 42 (composite layer 42E) located on the outermost side in the direction X1 contacts (is bonded to) the composite layer 32 (composite layer 32E) located on the outermost side in the direction X2 in the first laminate 30. In other words, the second laminate 40 contacts (is bonded to) the first laminate 30 in the airfoil 10. In the composite blade 1, in the airfoil 10, an interface between the first laminate 30 and the second laminate 40 overlaps a center axis Ax. In the composite blade 1, in the airfoil 10, it is preferred that the lengths (widths) of the first laminate 30 and the second laminate 40 along the direction X be the same.

In the blade root 14, the composite layers 42 extend along a second inclination direction B1 from the blade end part 21 to the base end part 22. The second inclination direction B1 is a direction inclined at a predetermined angle from the direction Z (direction Z2) toward the direction X2. In other words, the second inclination direction B1 is a direction inclined from the longitudinal direction (direction Z) toward a direction opposite to the first inclination direction A1. In the blade root 14, the composite layers 42 are laid up along a second lamination direction B2. The second lamination direction B2 is a direction orthogonal to the second inclination direction B1, and is a direction inclined from the lamination direction (direction X2) in the airfoil 10 toward the direction Z1.

In this manner, in the blade root 14, the composite layers 42 in the second laminate 40 extend in a direction away from the composite layers 32 in the first laminate 30. Thus, the second laminate 40 is separated from the first laminate 30 in the blade root 14. In this manner, the second laminate 40 contacts the first laminate 30 in the airfoil 10, but is separated from the first laminate 40 in the blade root 14.

As illustrated in FIG. 3 and FIG. 4, the composite layer 42 has the resin 44 and the reinforced fibers 46. The resin 44 and the reinforced fiber 46 have the same configurations as those of the resin 34 and the reinforced fiber 36 in the composite layer 32. Thus, the composite layer 42 can be regarded as the same composite layer as the composite layer 32 except for the extending direction and the lamination direction.

As illustrated in FIG. 3, in the composite layer 42, the reinforced fibers 46 extend along the direction Z (longitudinal direction) in the airfoil 10. In the composite layers 42, in the airfoil 10, layers in which a plurality of the reinforced fibers 46 extend along the direction Y are laid up along the direction X. The reinforced fiber 46 may extend while being inclined from the direction Z toward the direction Y in the airfoil 10. In other words, the reinforced fiber 46 only needs to extend in the airfoil 10 toward the direction Z2 along a plane parallel to the direction Z. The composite layer 42 may further have another reinforced fiber extending in a direction different from the direction of the reinforced fiber 46, and, for example, the other reinforced fiber may be woven into the reinforced fiber 46. The extending direction and the lamination direction of the reinforced fibers 46 may match the extending direction and the lamination direction of the reinforced fibers 36.

As illustrated in FIG. 4, in the composite layer 42, the reinforced fiber 46 extends along the second inclination direction B1 in the blade root 14. In the composite layer 42, in the blade root 14, layers in which a plurality of the reinforced fibers 46 extend along the direction Y are laid up along the second lamination direction B2. The reinforced fiber 46 may extend in the blade root 14 while being inclined from the second inclination direction B1 toward the direction Y. In other words, the reinforced fiber 46 only needs to extend in the blade root 14 toward the direction Z2 along a plane parallel to the second inclination direction B1.

Third Laminate

Next, the third laminate 50 is described. The third laminate 50 is a laminate in which a plurality of composite layers are laid up. As illustrated in FIG. 2, the third laminate 50 is provided between the first laminate 30 and the second laminate 40 in the blade root 14. Specifically, the third laminate 50 is provided in a space formed by separating the first laminate 30 and the second laminate 40 from each other in the blade root 14. The third laminate 50 contacts (is bonded to) the first laminate 30 on the direction X1 side, and contacts (is bonded to) the second laminate 40 on the direction X2 side. Thus, in the blade root 14, the third laminate 50 bonds the first laminate 30 and the second laminate 40 to integrate the first laminate 30 and the second laminate 40.

As illustrated in FIG. 2, in the third laminate 50, composite layers laid up on the direction X1 side, that is, on the first laminate 30 side, extend along the first inclination direction A1 (parallel to composite layers 32). In the third laminate 50, composite layers laid up on the direction X2 side, that is, on the second laminate 40 side (composite layers on second laminate 40 side with respect to composite layers extending along first inclination direction A1 in third laminate 50), extend along the second inclination direction B1 (parallel to composite layers 42).

More specifically, as illustrated in FIG. 2, the third laminate 50 has a one-side third laminate 60 and an another-side third laminate 70. The one-side third laminate 60 is a laminate of composite layers provided in a region in the third laminate 50 on the direction X1 side, that is, on the first laminate 30 side. In the present embodiment, the one-side third laminate 60 is provided on the direction X1 side with respect to the center axis Ax and on the direction X2 with respect to the first laminate 30.

In the example in FIG. 2, in the one-side third laminate 60, composite layers 62A, 62B, 62C, 62D, 62E, and 62F are laid up. The composite layers 62A, 62B, 62C, 62D, 62E, and 62F are laid up in this order toward the direction X2. In the following, the composite layers 62A, 62B, 62C, 62D, 62E, and 62F are referred to as "composite layers 62" unless otherwise distinguished from one another. The one-side third laminate 60 is bonded to the first laminate 30. Specifically, in the one-side third laminate 60, the composite layer 62 (composite layer 62A) located on the outermost side in the direction X1 contacts (is bonded to) the composite layer 32 (composite layer 32E) located on the outermost side in the direction X2 in the first laminate 30. In the example in FIG. 2, the one-side third laminate 60 has six composite layers 62, but the number of the laid-up composite layers 62 may be any number more than one.

The composite layers 62 are provided in the blade root 14, and extend along the first inclination direction A1 from the blade end part 21 toward the base end part 22. The composite layers 62 are laid up along the first lamination direction A2. In other words, the extending direction and the lamination direction of the composite layers 62 are the same as those of the composite layers 32 in the first laminate 30.

The composite layer 62 extends along the first inclination direction A1 from an end part 63A on the blade end part 21 side to an end part 63B on the base end part 22 side. In the one-side third laminate 60, the end parts 63A of the composite layers 62 are disposed near the center axis Ax so as to be in a row along the direction Z. In other words, the end parts 63A of the composite layer 62 overlap as seen from the direction Z. In the one-side third laminate 60, the end parts 63B of the composite layers 62 are disposed so as to be in a row along the direction X at the base end part 22.

As illustrated in FIG. 4, the composite layer 62 has the resin 64 and the reinforced fibers 66. The resin 64 and the reinforced fiber 66 have the same configurations as those of the resin 34 and the reinforced fiber 36 in the composite layer 32. Thus, the composite layer 62 can be regarded as a composite layer having the same extending direction and the same lamination direction as those of the composite layer 32.

As illustrated in FIG. 4, in the composite layer 62, the reinforced fibers 66 extend along the first inclination direction A1. In the composite layer 62, layers in which a plurality of the reinforced fibers 66 extend along the direction Y are laid up along the first lamination direction A2. The reinforced fiber 66 may extend while being inclined from the first inclination direction A1 toward the direction Y. In other words, the reinforced fiber 66 only needs to extend toward the direction Z2 along a plane parallel to the first inclination direction A1. The extending direction and the lamination direction of the reinforced fibers 66 may match the extending direction and the lamination direction of the reinforced fibers 36 in the blade root 14. In the composite layer 62, an end part of the reinforced fiber 66 on the blade end part 21 side can be regarded as the end part 63A. The composite layer 62 may further have another reinforced fiber extending in a direction different from the direction of the reinforced fiber 66, and, for example, the other reinforced fiber may be woven into the reinforced fiber 66.

The another-side third laminate 70 is a laminate of composite layers provided in a region in the third laminate 50 on the direction X2 side, that is, on the second laminate 40 side. In the present embodiment, the another-side third laminate 70 is provided on the direction X2 side with respect to the one-side third laminate 60 (center axis Ax) and on the direction X1 side with respect to the second laminate 40.

In the example in FIG. 2, in the another-side third laminate 70, composite layers 72A, 72B, 72C, 72D, 72E, and 72F are laid up. The composite layers 72A, 72B, 72C, 72D, 72E, and 72F are laid up in this order toward the direction X1. In the following, the composite layers 72A, 72B, 72C, 72D, 72E, and 72F are referred to as "composite layers 72" unless otherwise distinguished from one another. The surface of the another-side third laminate 70 on the direction X2 side is bonded to the second laminate 40. Specifically, in the another-side third laminate 70, the composite layer 72 (composite layer 72A) located on the outermost side in the direction X2 contacts (is bonded to) the composite layer 42 (composite layer 42E) located on the outermost side in the direction X1 in the second laminate 40. The another-side third laminate 70 on the direction X1 side is bonded to the one-side third laminate 60. In the example in FIG. 2, the another-side third laminate 70 has six composite layers 72, but the number of the laid-up composite layers 72 may be any number more than one.

The composite layers 72 are provided in the blade root 14, and extend along the second inclination direction B1 from the blade end part 21 toward the base end part 22. The composite layers 72 are laid up along the second lamination direction B2 direction. In other words, the extending direction and the lamination direction of the composite layers 72 are the same as those of the composite layer 42 in the second laminate 40.

The composite layer 72 extends along the second inclination direction B1 from an end part 73A on the blade end part 21 side to an end part 73B on the base end part 22 side. In the another-side third laminate 70, the end parts 73A of the composite layers 72 are disposed near the center axis Ax so as to be in a row along the direction Z. In other words, the end parts 73A of the composite layers 72 overlap as seen from the direction Z. In the another-side third laminate 70, the end parts 73B of the composite layers 72 are disposed so as to be in a row along the direction X in the base end part 22.

As illustrated in FIG. 4, the composite layer 72 has the resin 74 and the reinforced fibers 76. The resin 74 and the reinforced fiber 76 have the same configurations as those of the resin 34 and the reinforced fiber 36 in the composite layer 32. Thus, the composite layer 72 can be regarded as the same composite layer as the composite layer 32 except for the extending direction and the lamination direction.

As illustrated in FIG. 4, in the composite layer 72, the reinforced fibers 76 extend along the second inclination direction B1. In the composite layer 72, layers in which a plurality of reinforced fibers 76 extend along the direction Y are laid up along the second lamination direction B2. The reinforced fiber 76 may extend while being inclined from the second inclination direction B1 toward the direction Y. In other words, the reinforced fiber 76 only needs to extend toward the direction Z2 along a plane parallel to the second inclination direction B1. The extending direction and the lamination direction of the reinforced fibers 76 may match the extending direction and the lamination direction of the reinforced fibers 46 in the blade root 14. In the composite layer 72, an end part of the reinforced fiber 76 on the blade end part 21 side can be regarded as the end part 73A. The composite layer 72 may further have another reinforced fiber extending in a direction different from the direction of the reinforced fiber 76, and, for example, the other reinforced fiber may be woven into the reinforced fiber 76.

The end part 73A of the composite layer 72 is provided so as to be opposed to the end part 63A of the composite layer 62 in the direction X through the center axis Ax. Specifically, the composite layer 62 (for example, composite layer 62A) and the composite layer 72 (for example, composite layer 72A) opposed to each other have a triangular shape in which the composite layers 62 and 72 are two sides and the end part 63A is the vertex surrounded by the two sides. In other words, in the another-side third laminate 70, the composite layers 72 are laid up to be line-symmetric to the composite layers 62 in the one-side third laminate 60 across the center axis Ax.

As described above, the composite blade 1 includes the first laminate 30, the second laminate 40, and the third laminate 50 (one-side third laminate 60 and another-side third laminate 70). In the third laminate 50, a ply drop part P is formed between the end part 63A and the end part 73A opposed to each other. The ply drop part P refers to a region between composite layers, in which the number of laid up composite layers is reduced and which is filled with resin without reinforced fibers. As described above, the end part 63A and the end part 73A are provided near the center axis Ax and opposed to each other through the center axis Ax. The end parts 63A are arranged in the direction Z, and the end parts 73A are also arranged in the direction Z. Thus, in the blade root 14, the ply drop part P is provided to overlap the center axis Ax. A plurality of the ply drop parts P are provided for each of the composite layer 62 and the composite layer 72 opposed to each other, and are disposed in a row along the direction Z. The center axis Ax can be regarded as a center part between the first laminate 30 and the second laminate 40.

As illustrated in FIG. 3, in the airfoil 10, a center-to-center distance (pitch) between the reinforced fibers 36 in the composite layers 32 adjacent in the lamination direction is referred to as "distance L1". In the airfoil 10, a center-to-center distance (pitch) between the reinforced fibers 46 in the composite layers 42 adjacent in the lamination direction is referred to as "distance L2". In this case, it is preferred that the distance L1 be equal to the distance L2.

As illustrated in FIG. 4, in the blade root 14, a center-to-center distance (pitch) between the reinforced fibers 36 in the composite layers 32 adjacent in the lamination direction is referred to as "distance L3". In the blade root 14, a center-to-center distance (pitch) between the reinforced fibers 46 in the composite layers 42 adjacent in the lamination direction is referred to as "distance L4". A center-to-center distance (pitch) between the reinforced fibers 66 in the composite layers 62 adjacent in the lamination direction is referred to as "distance L5". A center-to-center distance (pitch) between the reinforced fibers 76 in the composite layers 72 adjacent in the lamination direction is referred to as "distance L6". In this case, it is preferred that the distance L3 be equal to the distance L4, the distance L5, and the distance L6. It is preferred that the distance L3 be equal to the distance L1 and the distance L4 be equal to the distance L2.

Method for Producing Composite Blade

Figure 5:
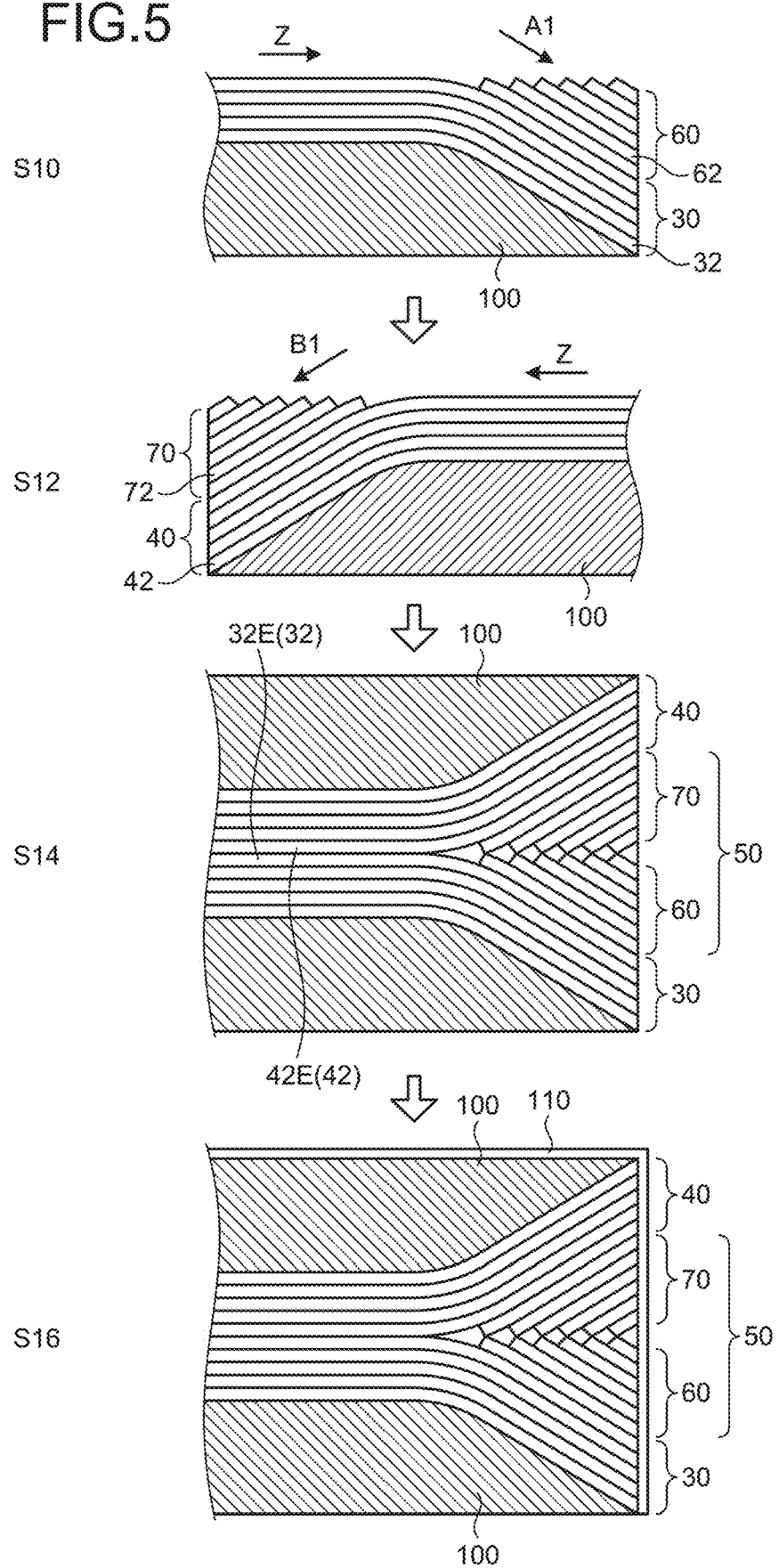
FIG. 5 is a schematic diagram for describing a method for producing the composite blade according to the first embodiment.

A method for producing (laying up) a composite blade 1 is described below. FIG. 5 is a schematic diagram for describing a method for producing the composite blade according to the first embodiment. As illustrated in FIG. 5, when producing the composite blade 1, a first laminate forming step is executed (Step S10). At the first laminate forming step, composite layers 32 are laid up on a base 100 to form a first laminate 30. At the first laminate forming step, the composite layers 32 are laid up such that each composite layer 32 extends along the direction Z (longitudinal direction) at a location to become an airfoil 10, and extends along the first inclination direction A1 at a location to become a blade root 14. In the present embodiment, at the first laminate forming step, composite layers 62 are laid up at a location to become the blade root 14 on the first laminate 30, to form a one-side third laminate 60 on the first laminate 30. At the first laminate forming step, the composite layers 32 and 62 are in the state in which resins 34 and 64 are uncured, that is, prepregs.

After the first laminate forming step is finished, a second laminate forming step is executed (Step S12). At the second laminate forming step, composite layers 42 are laid up on the base 100 to form a second laminate 40. At the second laminate forming step, the composite layers 42 are laid up such that each composite layer 42 extends along the direction Z (longitudinal direction) at a location to become the airfoil 10, and extends along the second inclination direction B1 at a location to become the blade root 14. In the present embodiment, at the second laminate forming step, composite layers 72 are laid up at a location to become the blade root 14 on the second laminate 40, to form an another-side third laminate 70 on the second laminate 40. At the second laminate forming step, the composite layers 42 and 72 are in the state in which resins 44 and 74 are uncured, that is, prepregs. The second laminate forming step is not necessarily required to be performed after the first laminate forming step, and may be performed before or simultaneously with the first laminate forming step.

After the first laminate forming step and the second composite material forming step are finished, a third laminate forming step is executed (Step S14). At the third laminate forming step, the first laminate 30 formed at the first laminate forming step and the second laminate 40 formed at the second laminate forming step are bonded together. Specifically, at the third laminate forming step, at a location to become the airfoil 10, the surface (of composite layer 32E) of the first laminate 30 is bonded to (joined with) the surface (of composite layer 42E) of the second laminate 40. At the third laminate forming step, the one-side third laminate 60 and the another-side third laminate 70 are bonded (joined) together at a location to become the blade root 14. In this manner, at the third laminate forming step, a third laminate 50 in which the one-side third laminate 60 and the another-side third laminate 70 are bonded is formed at a location to become the blade root 14. Also at the third laminate forming step, each composite layer is in the state in which resin is uncured, that is, prepreg. By executing the third laminate forming step in this manner, an uncured body of the composite blade 1 is produced.

After the third laminate forming step is finished, a molding step is executed (Step S16). At the molding step, the resin in the uncured body of the composite blade 1 formed at the third laminate forming step is cured to mold the composite blade 1. For example, at the molding step, the uncured body of the composite blade 1 is covered with bagging material 110 and vacuumed, and is then pressurized and heated in an autoclave furnace to cure the resin, thereby molding the composite blade 1. In this manner, the producing of the composite blade 1 is completed. At the molding step, the molding method is not limited to the above as long as the resin is cured to mold a cured body of the composite blade 1.

In the present embodiment, the one-side third laminate 60 is formed at the first laminate forming step and the another-side third laminate 70 is formed at the second laminate forming step, but the embodiment is not limited thereto. The one-side third laminate 60 is not necessarily required to be formed at the first laminate forming step, and the another-side third laminate 70 is not necessarily required to be formed at the second laminate forming step. In this case, for example, at the third laminate forming step, the first laminate 30 and the second laminate 40 are bonded or opposed while being separated from each other at a location to become the airfoil 10, and then the one-side third laminate 60 and the another-side third laminate 70 are formed between the first laminate 30 and the second laminate 40 at a location to become the blade root 14.

As described above, the composite blade 1 according to the present embodiment is formed by laying up composite layers in which reinforced fibers are impregnated with resin, and includes the blade root 14 and the airfoil 10 extending from the blade root 14 in the direction Z (longitudinal direction). The composite blade 1 includes the first laminate 30, the second laminate 40, and the third laminate 50. The first laminate 30 is a laminate of the composite layers 32, and extends along the longitudinal direction (direction Z) in the airfoil 10. In the blade root 14, the first laminate 30 extends along the first inclination direction A1 inclined toward a direction intersecting the longitudinal direction (direction Z). In the airfoil 10, the second laminate 40 extends along the longitudinal direction (direction Z), and contacts the first laminate 30. In the blade root 14, the second laminate 40 extends along the second inclination direction B1 inclined toward a direction opposite to the first inclination direction A1, and is separated from the first laminate 30. The third laminate 50 is provided between the first laminate 30 and the second laminate 40 in the blade root 14.

A turbine blade has the airfoil 10 and the blade root 14. The blade root 14 has a thickness (length along direction X) larger than that of the airfoil 10. To produce a turbine blade by laying up composite layers, the composite layers extended from the airfoil 10 need to be expanded outward in the region of the blade root 14. In this case, the composite layers are expanded outward in the blade root 14, and hence the interlayer distance (distance between reinforced fibers) between composite layers may be longer than the airfoil 10. In other words, the blade root 14 has a large region without reinforced fibers, and the strength thereof may be reduced.

In the composite blade 1 according to the present embodiment, on the other hand, in the blade root 14, the composite layers 32 in the first laminate 30 are inclined toward the first inclination direction A1, and the composite layers 42 in the second laminate 40 are inclined toward the second inclination direction B1, so that the blade root 14 having a large thickness is appropriately formed. In addition, in the blade root 14, the first laminate 30 and the second laminate 40 are separated, and the third laminate 50 is provided at a location where the first laminate 30 and the second laminate 40 are separated. Consequently, the composite blade 1 can suppress the reduction in strength of the blade root 14 by compensating for a region having reinforced fibers by the third laminate 50 in the blade root 14.

The composite blade 1 has the ply drop part P. The ply drop part P is a region containing no reinforced fiber, and hence the ply drop part P has relatively low strength and may be a starting point of delamination of the composite layers. When a gas turbine is driven, centrifugal force toward the direction Z1 acts on the composite blade 1, and the blade root 14 is constrained to the groove 2A in the turbine disk 2, and hence stress to peel the composite layers acts on the blade root 14. This stress becomes lower toward the center axis Ax from the surface of the blade root 14. In the composite blade 1, the ply drop parts P can be concentrated near the center axis Ax where stress is low, and can be prevented from being provided near the surface. Consequently, the composite blade 1 can suppress the reduction in strength of the blade root 14 to suppress the peeling in the blade root.

In the third laminate 50, the composite layers 62 laid up on the first laminate 30 side extend along the first inclination direction A1, and the composite layers 72 laid up on the second laminate 40 side extend along the second inclination direction B1. By aligning the extending direction of the composite layers in the third laminate 50 with the first laminate 30 and the second laminate 40 as described above, the composite layer 1 can appropriately concentrate the ply drop parts P near the center axis Ax, and suppress the peeling in the blade root.

In the first laminate 30, the reinforced fiber 36 in the composite layer 32 continuously extends from the airfoil 10 to the blade root 14. The reinforced fiber 36 extends along a plane parallel to the longitudinal direction (direction Z) in the airfoil 10, and extends along a plane parallel to the first inclination direction A1 in the blade root 14. In the second laminate 40, the reinforced fiber 46 in the composite layer 42 continuously extends from the airfoil 10 to the blade root 14. The reinforced fiber 46 extends along a plane parallel to the longitudinal direction (direction Z) in the airfoil 10, and extends along a plane parallel to the second inclination direction B1 in the blade root 14. In the third laminate 50, the reinforced fibers 66 in the composite layers 62 laid up on the first laminate 30 side extend along a plane parallel to the first inclination direction A1. In the third laminate 50, the reinforced fibers 76 in the composite layers 72 laid up on the second laminate 40 side extend along a plane parallel to the second inclination direction B1. By aligning the extending direction of the reinforced fibers 66 in the third laminate 50 with the plane parallel to the first inclination direction A1 and aligning the extending direction of the reinforced fibers 76 in the third laminate 50 with the plane parallel to the second inclination direction B1, the composite blade 1 can appropriately concentrate the ply drop parts P near the center axis Ax. Consequently, the composite blade 1 can suppress the peeling in the blade root 14.

The third laminate 50 includes the one-side third laminate 60 and the another-side third laminate 70. The one-side third laminate 60 is provided on the first laminate 30 side, and the reinforced fiber 66 in the composite layer 62 extends along a plane parallel to the first inclination direction A1. The another-side third laminate 70 is provided on the second laminate 40 side, and the reinforced fiber 76 in the composite layer 72 extends along a plane parallel to the second inclination direction B1. By providing the one-side third laminate 60 and the another-side third laminate 70, the composite blade 1 can appropriately concentrate the ply drop parts P near the center axis Ax. Consequently, the composite blade 1 can suppress the peeling in the blade root 14.

The tip (end part 63A) of the reinforced fiber 66 in the one-side third laminate 60 is opposed to the tip (end part 73A) of the reinforced fiber 76 in the another-side third laminate 70. By opposing the tip of the reinforced fiber 66 and the tip of the reinforced fiber 76 to each other, the composite blade 1 can appropriately concentrate the ply drop parts P near the center axis Ax. Consequently, the composite blade 1 can suppress the peeling in the blade root 14.

The location at which the tip (end part 63A) of the reinforced fiber 66 in the one-side third laminate 60 and the tip (end part 73A) of the reinforced fiber 76 in the another-side third laminate 70 are opposed to each other is located between the first laminate 30 and the second laminate 40 in the blade root 14, and at a center part (near center axis Ax) between the first laminate 30 and the second laminate 40. The location at which the end part 63A and the end part 73A are opposed to each other, that is, the location between the end part 63A and the end part 73A, is the ply drop part P, which is a region filled with resin without reinforced fibers. By providing the ply drop part P at the center part where stress in the peeling direction is small, the composite blade 1 can suppress the peeling in the blade root 14.

Figure 6:
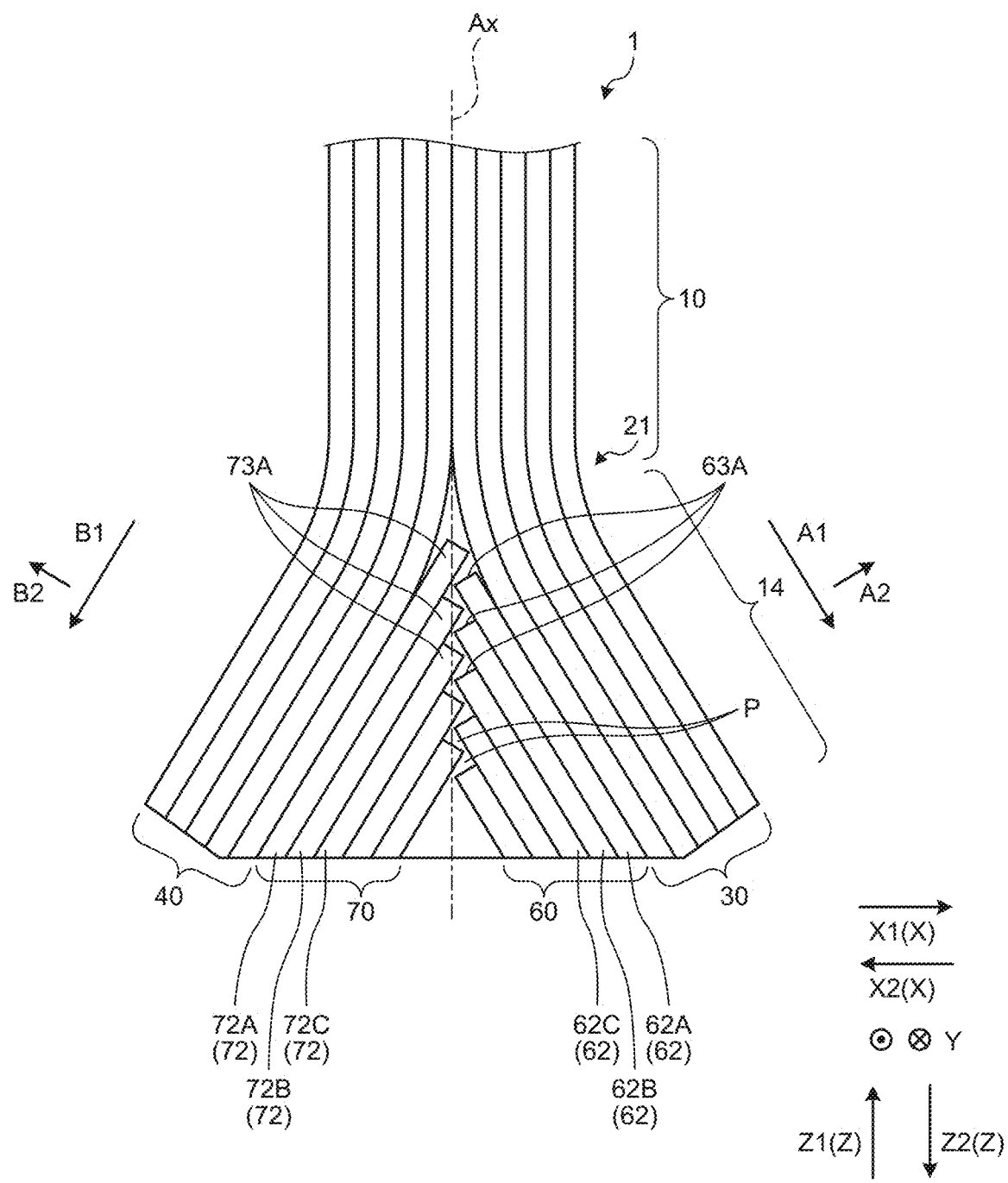
FIG. 6 is a schematic diagram illustrating another example of the composite blade.

FIG. 6 is a schematic diagram illustrating another example of the composite blade. In the present embodiment, the end part 63A and the end part 73A are opposed to each other in the direction X through the center axis Ax. However, the end part 63A and the end part 73A are not necessarily required to be opposed to each other in the direction X through the center axis Ax. For example, as illustrated in FIG. 6, the end part 63A of the composite layer 62 may be opposed to the surface of the composite layer 72, and the end part 73A of the composite layer 72 may be opposed to the surface of the composite layer 62. In the example in FIG. 6, the end part 63A of the composite layer 62A is opposed to the surface of the composite layer 72A, the end part 73A of the composite layer 72B is opposed to the surface of the composite layer 62A, and the end part 63A of the composite layer 62B is opposed to the surface of the composite layer 72B. In other words, in the example in FIG. 6, the end parts of the composite layer 62 and the composite layer 72 are alternately opposed to the surface of the other (mated) composite layer. By opposing the end part and the surface to each other, the region of the ply drop part P can be reduced to suppress the reduction in strength of the blade root 14.

Next, a second embodiment is described. A composite blade 1a according to the second embodiment is different from the first embodiment in the structure of a third laminate 50a. In the second embodiment, descriptions of parts whose configurations are common to the first embodiment are omitted.

Figure 7:
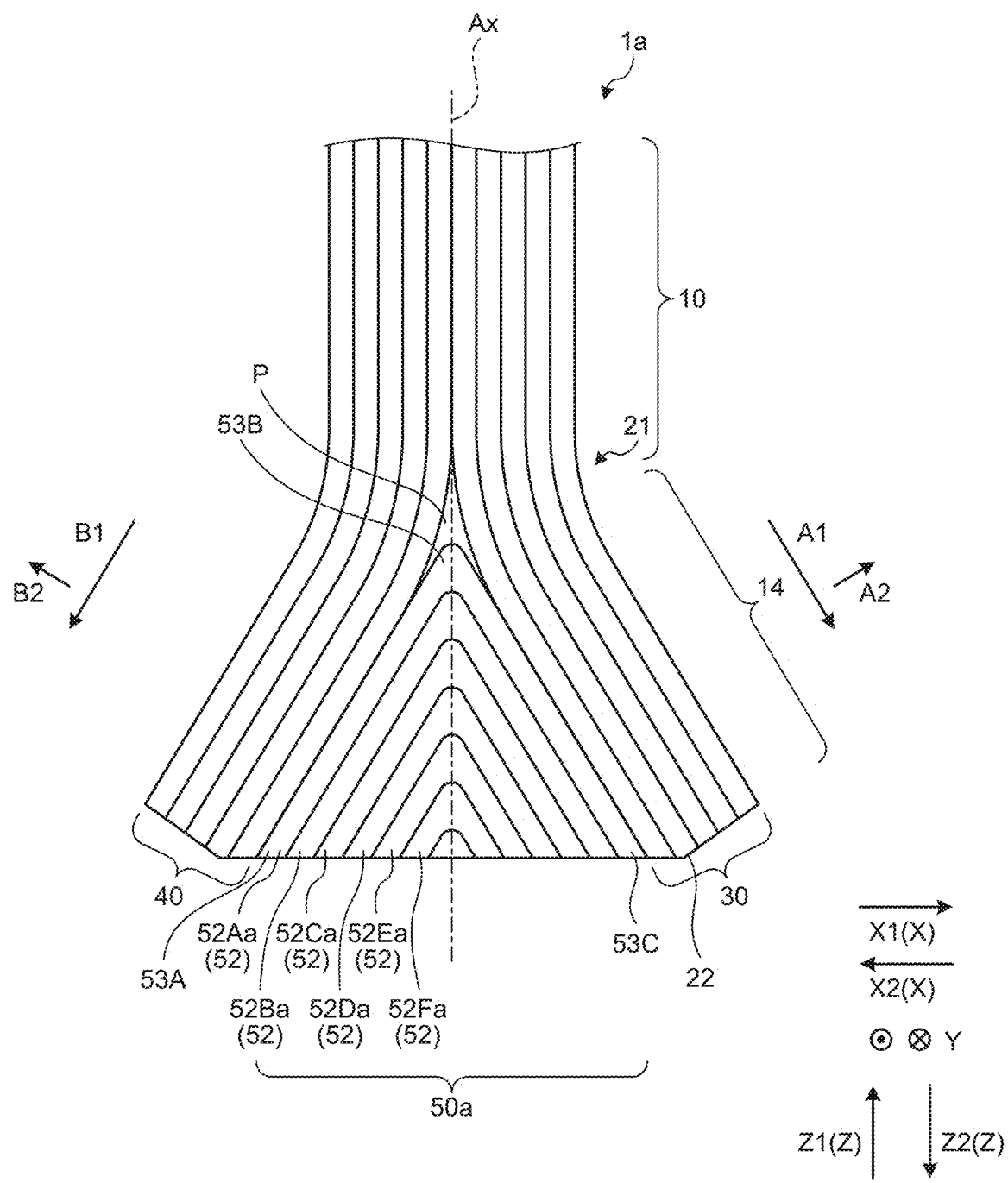
FIG. 7 is a schematic diagram illustrating a detailed configuration of a composite blade according to a second embodiment.
Figure 8:
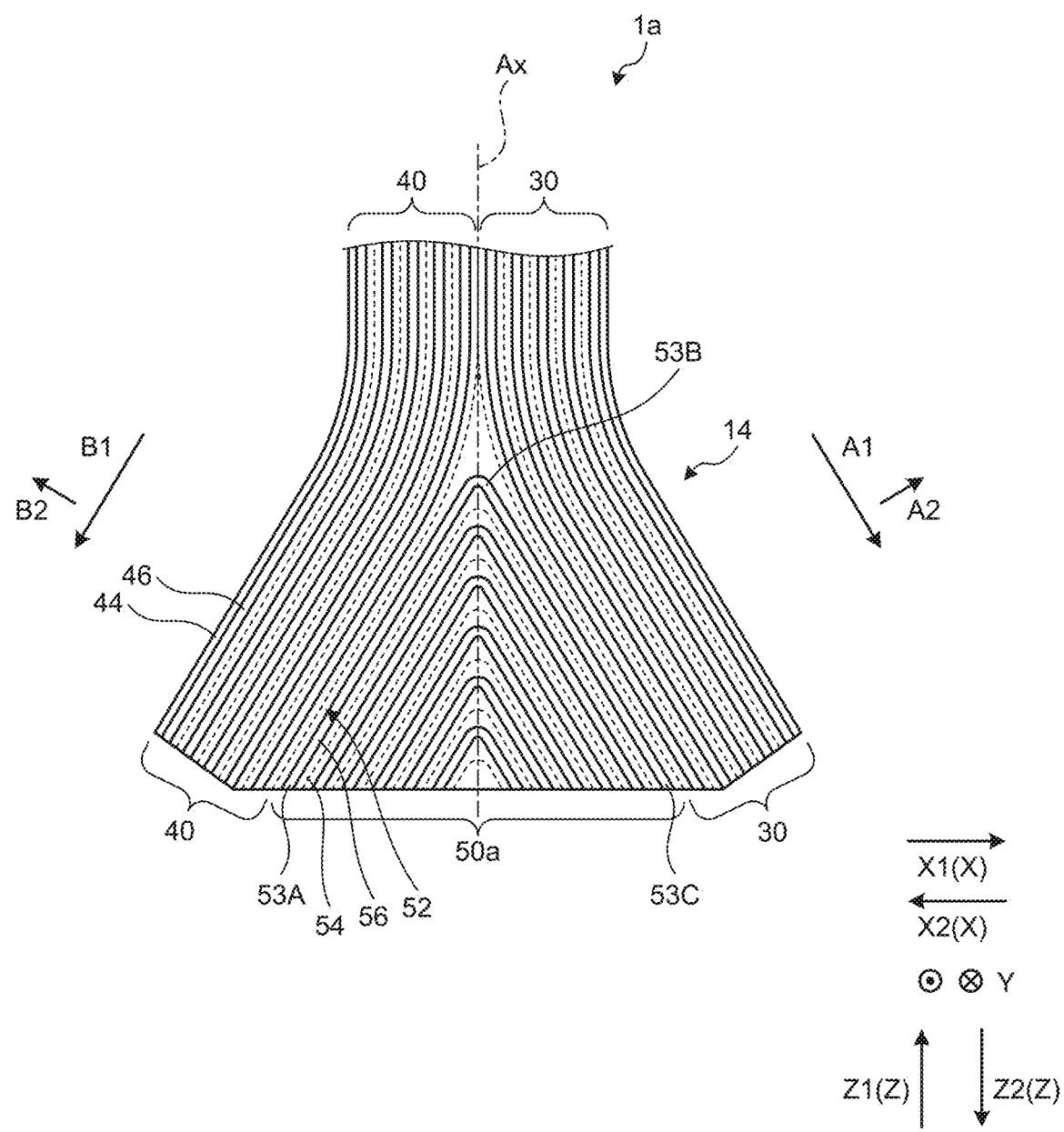
FIG. 8 is a schematic diagram of composite layers according to the second embodiment.

FIG. 7 is a schematic diagram illustrating the detailed configuration of the composite blade according to the second embodiment. FIG. 8 is a schematic diagram of composite layers according to the second embodiment. As illustrated in FIG. 7, the composite blade 1a has the third laminate 50a. In the third laminate 50a, composite layers 52Aa, 52Ba, 52Ca, 52Da, 52Ea, and 52Fa are laid up. The composite layers 52Aa, 52Ba, 52Ca, 52Da, 52Ea, and 52Fa are laid up in this order along the direction X1. In the following, the composite layers 52Aa, 52Ba, 52Ca, 52Da, 52Ea, and 52Fa are referred to as "composite layers 52" unless otherwise distinguished from one another.

The composite layer 52 extends from an end part 53A to an end part 53C through an intermediate part 53B. The end part 53A is an end part of the composite layer 52 on the direction X2 side. The end part 53C is an end part of the composite layer 52 on the direction X1 side. The intermediate part 53B is a location between the end part 53A and the end part 53C. The intermediate part 53B is provided at a position overlapping the center axis Ax. A region from the end part 53A to the intermediate part 53B is a location of the composite layer 52 on the direction X2 side, and a region from the intermediate part 53B to the end part 53C is a location of the composite layer 52 on the direction X1 side.

In the composite layer 52, the region from the intermediate part 53B to the end part 53A on the direction X2 side extends along the inclination direction B1. The composite layer 52 is bent at the intermediate part 53B, and its extending direction changes. In the composite layer 52, the region from the intermediate part 53B to the end part 53C on the direction X1 side extends along the inclination direction A1. In other words, in the composite layer 52, the region from the intermediate part 53B to the end part 53A corresponds to the composite layer 72 in the first embodiment, and the region from the intermediate part 53B to the end part 53C corresponds to the composite layer 62 in the first embodiment. However, in the composite layer 52, the location extending along the inclination direction A1 and the location extending along the inclination direction B1 are continuous unlike the first embodiment. In the second embodiment, a ply drop part P is provided on the direction Z1 side of the intermediate part 53B of the composite layer 52Aa.

As illustrated in FIG. 8, the composite layer 52 has resin 54 and reinforced fibers 56. The resin 54 and the reinforced fibers 56 have the same configurations at the resin 34 and the reinforced fibers 36 in the composite layer 32. Thus, the composite layer 52 can be regarded as the same composite layer as the composite layer 32 except for the extending direction and the lamination direction.

As illustrated in FIG. 8, in the composite layer 52, an end part of the reinforced fiber 56 on the direction X2 side can be regarded as the end part 53A, and an end part of the reinforced fiber 56 on the direction X1 side can be regarded as the end part 53C. The intermediate part 53B can be regarded as a location between the end parts 53A and 53B of the reinforced fiber 56. Thus, in the composite layer 52, the reinforced fiber 56 can be regarded as continuously extending from the first laminate 30 side (end part 53C) to the second laminate 40 side (end part 53A). The reinforced fiber 56 extends along the inclination direction B1 from the intermediate part 53B to the end part 53A, which is the region on the direction X2 side. The reinforced fiber 56 is bent at the intermediate part 53B, and its extending direction changes. The reinforced fiber 56 extends along the inclination direction A1 from the intermediate part 53B to the end part 53C, which is the region on the direction X1 side. In other words, the reinforced fiber 56 extends from the intermediate part 53B to the end part 53A in the same direction as the reinforced fiber 76 in the first embodiment, and extends from the intermediate part 53B to the end part 53C in the same direction as the reinforced fiber 66 in the first embodiment. The composite layer 52 may further have another reinforced fiber extending in a direction different from the direction of the reinforced fiber 56, and, for example, the other reinforced fiber may be woven into the reinforced fiber 56.

Figure 9:
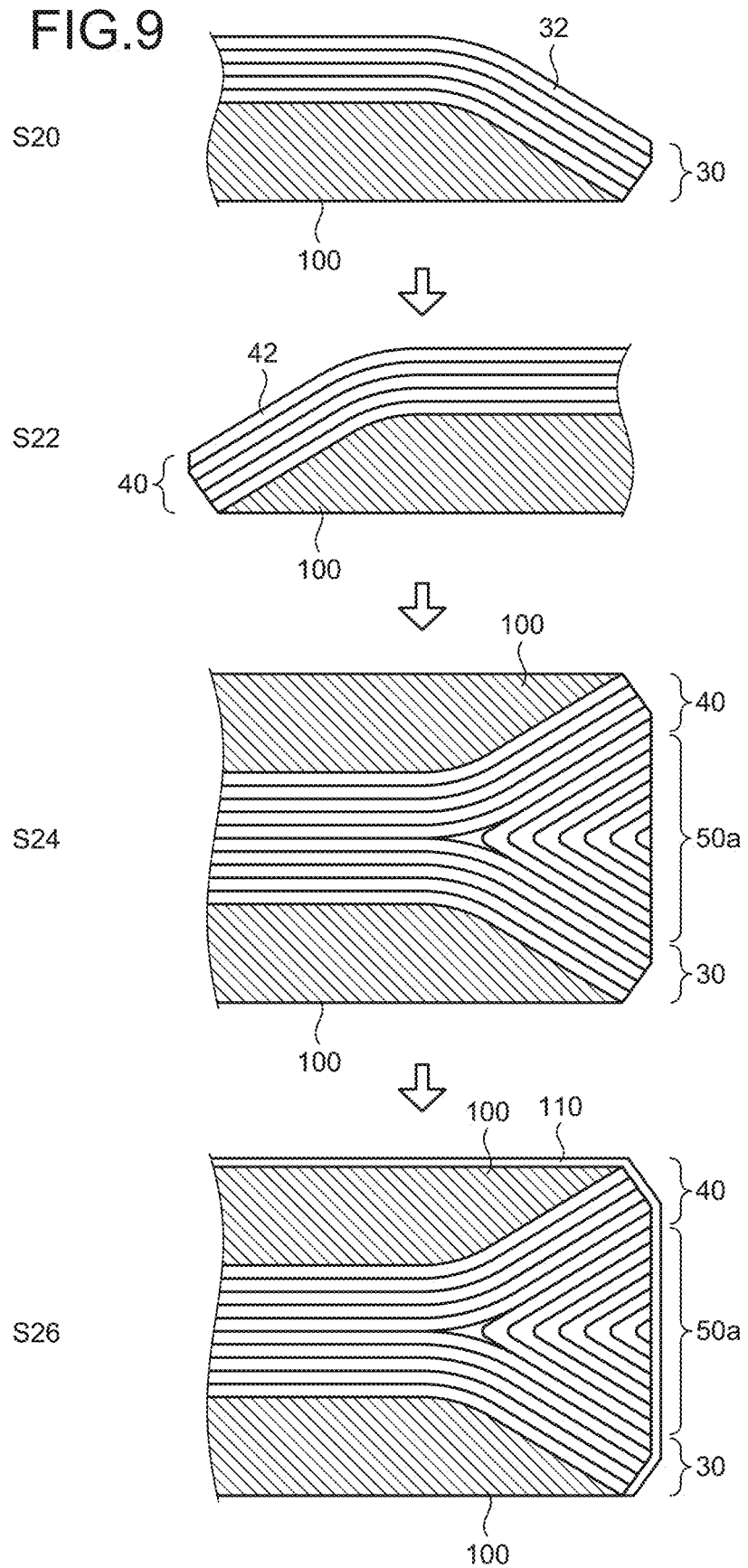
FIG. 9 is a schematic diagram for describing a method for producing the composite blade according to the second embodiment.

Next, a method for producing (laying up) a composite blade 1a is described. FIG. 9 is a schematic diagram for describing a method for producing a composite blade according to the second embodiment. As illustrated in FIG. 9, when producing the composite blade 1a, a first laminate forming step is executed (Step S20), and a second laminate forming step is executed (Step S22). At the first laminate forming step in the second embodiment, the one-side third laminate 60 is not formed, and the other processes are the same as those in the first laminate forming step (Step S10 in FIG. 5) in the first embodiment. At the second laminate forming step in the second embodiment, the another-side third laminate 70 is not formed, and the other processes are the same as those in the second laminate forming step (step S12 in FIG. 5) in the first embodiment.

After the first laminate forming step and the second laminate forming step are finished, a third laminate forming step is executed (Step S24). At the third laminate forming step, the first laminate 30 and the second laminate 40 are bonded at a location to become the airfoil 10, and a third laminate 50a is formed between the first laminate 30 and the second laminate 40 at a location to become the blade root 14. The third laminate 50a may be formed by laying up composite layers 52 between the first laminate 30 and the second laminate 40, or the third laminate 50a in which composite layers 52 are laid up in advance may be disposed between the first laminate 30 and the second laminate 40. At the third laminate forming step, each composite layer is in the state in which resin is uncured, that is, prepreg. At the third laminate forming step, the third laminate 50a may be formed between the first laminate 30 and the second laminate 40 at a location to become the blade root 14 while the first laminate 30 and the second laminate 40 are separated and opposed to each other at a location to become the airfoil 10. In this case, after that, the first laminate 30 and the second laminate 40 are bonded at a location to become the airfoil 10.

After the third laminate forming step is finished, a molding step is executed (Step S26) to cure the resin and mold the composite blade 1a. The molding step according to the third embodiment is the same as the molding step (Step S16 in FIG. 5) according to the first embodiment. In this manner, the producing of the composite blade 1a is completed.

As described above, in the third laminate 50a according to the second embodiment, the reinforced fiber 56 in the composite layer 52 continuously extends from the first laminate 30 side (end part 53C) to the second laminate 40 side (end part 53A). The reinforced fiber 56 extends along a plane parallel to the first inclination direction A1 on the first laminate 30 side, and extends along a plane parallel to the second inclination direction B1 on the second laminate 40 side. In the composite blade 1a according to the second embodiment, the reinforced fibers 56 in the third laminate 50a extend as described above, and hence the ply drop parts P can be appropriately concentrated near the center axis Ax. Thus, the composite blade 1a can suppress the peeling in the blade root 14. In the composite blade 1a according to the second embodiment, the reinforced fiber 56 is continuous through the intermediate part 53B, and hence the number of the ply drop parts P can be reduced to more appropriately suppress the reduction in strength of the blade root 14.

In the third laminate 50a according to the second embodiment, the bending intermediate part 53B is located between the first laminate 30 and the second laminate 40 in the blade root 14, and at a center part (near center axis Ax) between the first laminate 30 and the second laminate 40. The intermediate part 53B is a location between a part of the third laminate 50a that extends along a plane parallel to the first inclination direction (inclination direction A1) and a part of the third laminate 50a that extends along a plane parallel to the second inclination direction (inclination direction B1). The region near the intermediate part 53B is a ply drop part P, and is a region filled with resin without reinforced fibers. By providing the ply drop part P at the center part where stress in the peeling direction is small, the composite blade 1 can suppress the peeling in the blade root 14.

Next, a third embodiment is described. A composite blade 1b according to the third embodiment is different from the first embodiment in having a block part 80. In the third embodiment, descriptions of parts common to the first embodiment are omitted.

Figure 10:
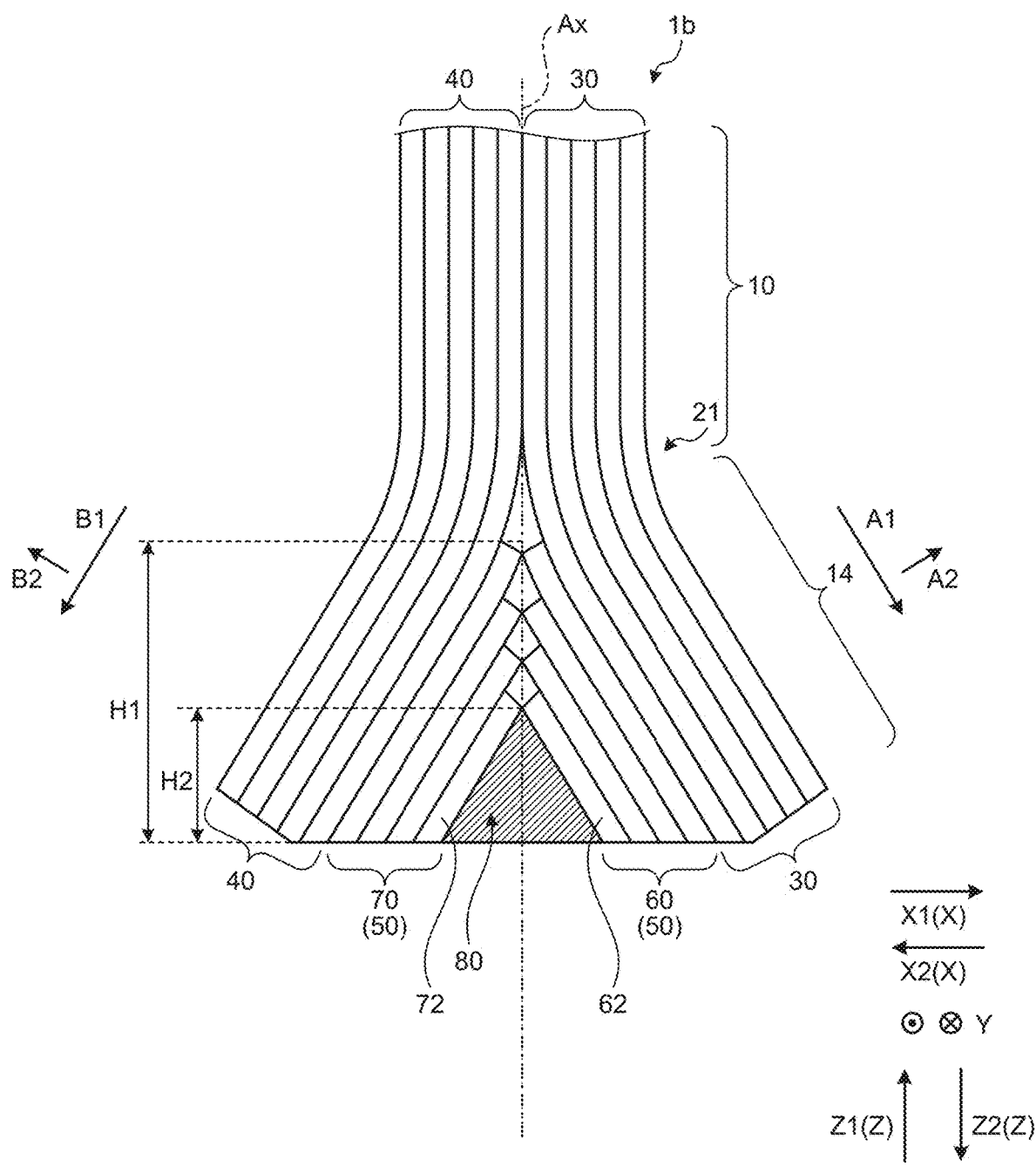
FIG. 10 is a schematic diagram illustrating a detailed configuration of a composite blade according to a third embodiment.

FIG. 10 is a schematic diagram illustrating a detailed configuration of the composite blade according to the third embodiment. As illustrated in FIG. 10, the composite blade 1b has the block part 80. The block part 80 is provided between the first laminate 30 and the second laminate 40 in the blade root 14 on the base end part 22 side of the third laminate 50. The base end part 22 can be regarded as an end part of the blade root 14 on the opposite side of the airfoil 10. In the example in FIG. 10, the block part 80 is a triangular prism, in which the surface of one of the three sides of the triangular prism contacts (is bonded to) the surface of the composite layer 62 located on the outermost side in the direction X2 in the one-side third laminate 60. In the block part 80, the surface of another one of the three sides of the triangular prism contacts (is bonded to) the surface of the composite layer 72 located on the outermost side in the direction X1 in the another-side third laminate 70. The surface of the remaining one of the three sides of the triangular prism forms the base end part 22.

The block part 80 in the present embodiment is the same composite layer as the first laminate 30, but the extending direction of the composite layers (reinforced fibers) may be freely set, and may be a direction different from the first inclination direction A1 and the second inclination direction B1. Similarly, in the block part 80, the lamination direction of the composite layers (reinforced fibers) may be freely set, and may be a direction different from the first lamination direction A2 and the second lamination direction B2. The block part 80 is cured in advance at the time when the first laminate 30 and other layers are laid up. The block part 80 is not limited to a composite layer, and may be metal, for example. In the case of metal, light metal such as an aluminum alloy and a titanium alloy is preferred.

The length from an end part of the third laminate 50 on the direction Z1 side to the base end part 22 is referred to as "length H1". The length from an end part of the block part 80 on the direction Z1 side to the base end part 22 is referred to as "length H2". It is preferred that the length H2 be 50% or less of the length H1. When the length H2 falls within this range, the block part 80 is disposed in a region where stress is low. Thus, even when another piece such as the block part 80 is used, the risk of damage of the composite blade 1b can be reduced.

Figure 11:
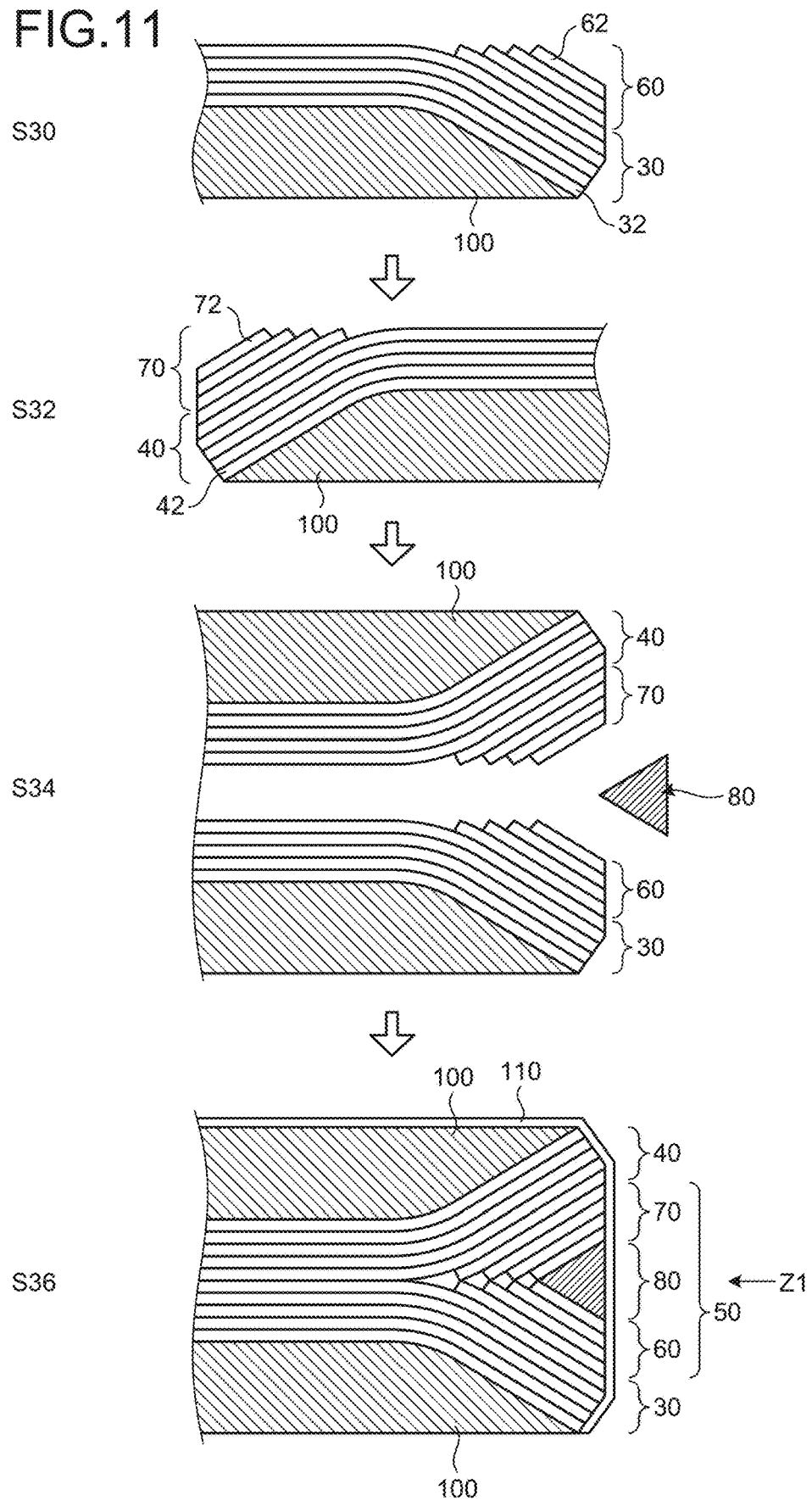
FIG. 11 is a schematic diagram for describing a method for producing the composite blade according to the third embodiment.

Next, a method for producing (laying up) a composite blade 1b is described. FIG. 11 is a schematic diagram for describing a method for producing the composite blade according to the third embodiment. As illustrated in FIG. 11, when producing the composite blade 1b, a first laminate forming step is executed (Step S30), and a second laminate forming step is executed (Step S32). The first laminate forming step in the third embodiment is the same as the first laminate forming step (step S10 in FIG. 5) in the first embodiment. The second laminate forming step in the third embodiment is the same as the second laminate forming step (step S12 in FIG. 5) in the first embodiment. However, in the composite blade 1b, the size of the third laminate 50 may be reduced (number of laid-up composite layers may be reduced) as compared with the first embodiment because the block part 80 is provided.

After the first laminate forming step and the second laminate forming step are finished, a third laminate forming step is executed (Step S34). At the third laminate forming step, in the state in which the first laminate 30 and the second laminate 40 are opposed to each other with a gap therebetween at a location to become the airfoil 10 and the one-side third laminate 60 and the another-side third laminate 70 are opposed to each other with a gap therebetween at a location to become the blade root 14, the block part 80 is inserted between the first laminate 30 and the second laminate 40 at the location to become the blade root 14 on the base end part 22 side of the one-side third laminate 60 and the another-side third laminate 70. At the third laminate forming step, the block part 80 has already been cured, but the other composite layers are uncured prepregs. After that, the first laminate 30 and the second laminate 40 are bonded together at the location to become the airfoil 10, the one-side third laminate 60 and the another-side third laminate 70 are bonded together at the location to become the blade root 14, and the block part 80 is bonded to the one-side third laminate 60 and the another-side third laminate 70. In this manner, the uncured composite blade 1b is formed. At the third laminate forming step, the block part 80 may be inserted in the state in which the first laminate 30 and the second laminate 40 are bonded together at the location to become the airfoil 10 and the one-side third laminate 60 and the another-side third laminate 70 are bonded together at the location to become the blade root 14.

After the third laminate forming step is finished, a molding step is executed (Step S36) to cure the resin and mold the composite blade 1b. At the molding step according to the third embodiment, the composite blade 1b is molded by the same method as the molding step in the first embodiment. At the molding step according to the third embodiment, the block part 80 can be pushed to the direction Z1 side by vacuuming and pressurizing with the bagging material 110, and hence ply drop parts P and voids in each composite layer can be suppressed. The molding step according to the third embodiment is not limited thereto and can be freely selected as long as resin is cured. At the molding step according to the third embodiment, it is preferred that the first laminate 30, the second laminate 40, and the third laminate 50 be formed while pushing the block part 80 to the direction Z1 side, that is, pushing the block part 80 toward the third laminate 50. In this case, for example, the block part 80 may be pushed to the direction Z1 side by a plunger for molding.

As described above, the composite blade 1b according to the third embodiment has the block part 80. The block part 80 is provided between the first laminate 30 and the second laminate 40 in the blade root 14 on the base end part 22 side of the third laminate 50. In the composite blade 1b, the block part 80 different from the third laminate 50 is provided, and hence the number of laid-up layers in the third laminate 50 can be reduced. Specifically, for example, in the producing of the composite blade 1b, the block part 80 cured in advance is used, and hence the increase in number of composite layers can be suppressed to facilitate the producing. By curing the block part 80 in advance, abnormal temperature increase caused by curing exotherm during molding can be suppressed.

EXAMPLE

Figure 12:
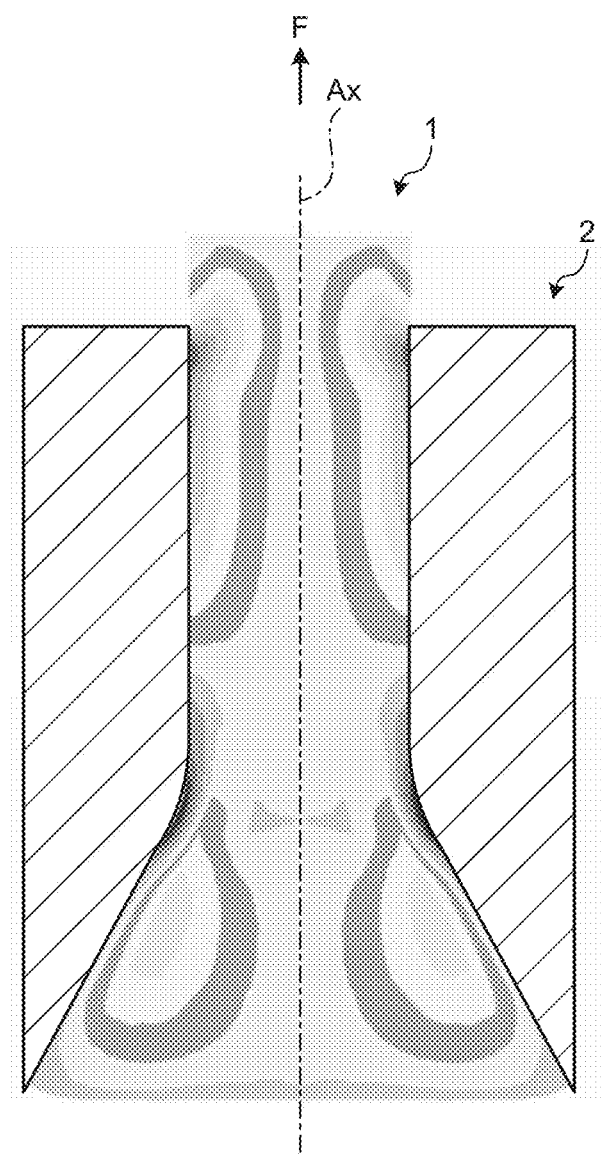
FIG. 12 is a diagram illustrating stress distribution according to an example.

Next, an example is described. FIG. 12 is a diagram illustrating stress distribution according to the example. In the example, a model of the composite blade 1 according to the first embodiment was used to analyze stress distribution in a state in which centrifugal force in the direction Z1 acted such that the blade root 14 was constrained by the groove 2A in the turbine disk 2. As illustrated in FIG. 12, in the model of the composite blade 1, when centrifugal force F was caused, peeling stress was small near the center axis Ax. Thus, it is understood from the analysis result that the peeling is suppressed by concentrating the ply drop parts P near the center axis Ax so as to be away from the surface of the blade root 14.

While the embodiments of the present disclosure have been described, the embodiments are not limited by the contents in the embodiments. The above-mentioned components include the ones that can be easily conceived by a person skilled in the art and the ones that are substantially the same, that is, include the range of equivalent. The above-mentioned components can be appropriately combined. In addition, the components can be variously omitted, replaced, and changed within the range not departing from the gist of the above-mentioned embodiments.

REFERENCE SIGNS LIST

1 Composite blade
2 Turbine disk
10 Airfoil
14 Blade root
20 Tip part
21 Blade end part
22 Base end part
30 First laminate
32, 42, 52, 62, 72 Composite layer
34, 44, 54, 64, 74 Resin
36, 46, 56, 66, 76 Reinforced fiber
40 Second laminate
50 Third laminate
60 One-side third laminate
70 Another-side third laminate
A1 First inclination direction
B1 Second inclination direction

The invention claimed is:

1. A composite blade formed by laying up composite layers in which reinforced fibers are impregnated with resin, the composite blade having a blade root and an airfoil extending from the blade root in a longitudinal direction, the composite blade comprising:
  a first laminate as a laminate of the composite layers, the first laminate extending along the longitudinal direction in the airfoil and extending along a first inclination direction inclined toward a direction intersecting the longitudinal direction in the blade root;
  a second laminate as a laminate of the composite layers, the second laminate extending along the longitudinal direction and contacting the first laminate in the airfoil, the second laminate extending along a second inclination direction inclined toward a direction opposite to the first inclination direction in the blade root and being separated from the first laminate; and
  a third laminate as a laminate of the composite layers, the third laminate being provided between the first laminate and the second laminate in the blade root,
  wherein, in the first laminate, reinforced fibers in the composite layer continuously extend from the airfoil to the blade root, extend along a plane parallel to the longitudinal direction at the airfoil, and extend along a plane parallel to the first inclination direction at the blade root, in the second laminate, reinforced fibers in the composite layer continuously extend from the airfoil to the blade root, extend along a plane parallel to the longitudinal direction at the airfoil, and extend along a plane parallel to the second inclination direction at the blade root, and in the third laminate, reinforced fibers in the composite layer continuously extend from the first laminate side to the second laminate side, extend along a plane parallel to the first inclination direction on the first laminate side, and extend along a plane parallel to the second inclination direction on the second laminate side.

2. The composite blade according to claim 1, wherein, in the third laminate, composite layers laid up on the first laminate side extend along the first inclination direction, and composite layers laid up on the second laminate side extend along the second inclination direction.

3. The composite blade according to claim 1, further comprising a block part provided between the first laminate and the second laminate at the blade root and provided on a base end part side opposite to the airfoil in the blade root with respect to the third laminate.

4. The composite blade according to claim 1, wherein, in the third laminate, a bending intermediate part between a location extending along a plane parallel to the first inclination direction and a location extending along a plane parallel to the second inclination direction is located between the first laminate and the second laminate in the blade root, and at a center part between the first laminate and the second laminate.

5. A method for producing a composite blade formed by laying up composite layers in which reinforced fibers are impregnated with resin, the composite blade having a blade root and an airfoil extending from the blade root in a longitudinal direction, the method comprising:

forming a first laminate as a laminate of the composite layers, the first laminate extending along the longitudinal direction in the airfoil and extending along a first inclination direction inclined toward a direction intersecting the longitudinal direction in the blade root;

forming a second laminate as a laminate of the composite layers, the second laminate extending along the longitudinal direction and contacting the first laminate in the airfoil, the second laminate extending along a second inclination direction inclined toward a direction opposite to the first inclination direction in the blade root and being separated from the first laminate; and forming a third laminate as a laminate of the composite layers, the third laminate being provided between the first laminate and the second laminate in the blade root, wherein forming the first laminate includes laying up composite layers to form a one-side third laminate on the first laminate in the blade root, forming the second laminate includes laying up composite layers to form an another-side third laminate on the second laminate in the blade root, and forming the third composite layer includes bonding the first laminate to the second laminate in the airfoil and bonding the one-side third laminate to the another-side third laminate in the blade root to form the third laminate.

6. A method for producing a composite blade in which reinforced fibers are impregnated with resin, the composite blade having a blade root and an airfoil extending from the blade root in a longitudinal direction, the method comprising:

forming a first laminate as a laminate of the composite layers, the first laminate extending along the longitudinal direction in the airfoil and extending along a first inclination direction inclined toward a direction intersecting the longitudinal direction in the blade root;

forming a second laminate as a laminate of the composite layers, the second laminate extending along the longitudinal direction and contacting the first laminate in the airfoil, the second laminate extending along a second inclination direction inclined toward a direction opposite to the first inclination direction in the blade root and being separated from the first laminate;

forming a third laminate as a laminate of the composite layers, the third laminate being provided between the first laminate and the second laminate in the blade root; and molding the first laminate, the second laminate, and the third laminate by inserting a block part to a side of a base end part of the blade root opposite to the airfoil with respect to the third laminate between the first laminate and the second laminate in the blade root and pushing the block part toward the third laminate.

\* \* \* \* \*